United States Patent
Miyagawa et al.

(10) Patent No.: US 8,418,612 B2
(45) Date of Patent: Apr. 16, 2013

(54) PRINTING PLATE MAKING APPARATUS AND PRINTING PLATE MAKING METHOD

(75) Inventors: Ichirou Miyagawa, Kanagawa (JP); Takeshi Kiso, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 1020 days.

(21) Appl. No.: 12/396,491

(22) Filed: Mar. 3, 2009

(65) Prior Publication Data

US 2009/0223397 A1    Sep. 10, 2009

(30) Foreign Application Priority Data

Mar. 7, 2008 (JP) ................. 2008-058159
Mar. 7, 2008 (JP) ................. 2008-058160
Jan. 19, 2009 (JP) ................. 2009-009055

(51) Int. Cl.
*B41C 1/05* (2006.01)
*G03F 7/20* (2006.01)

(52) U.S. Cl.
USPC .......... 101/401.1; 101/395; 347/224

(58) Field of Classification Search .......... None
See application file for complete search history.

(56) References Cited

U.S. PATENT DOCUMENTS

| | | | |
|---|---|---|---|
| 5,236,763 A | 8/1993 | Luthi | |
| 6,150,629 A | 11/2000 | Sievers | |
| 7,800,638 B2 * | 9/2010 | Ogawa | 347/224 |
| 7,827,912 B2 * | 11/2010 | Siman-Tov et al. | 101/401.1 |
| 2006/0279794 A1 | 12/2006 | Jurgensen | |

FOREIGN PATENT DOCUMENTS

| | | |
|---|---|---|
| JP | 6-234262 | 8/1994 |
| JP | 3556204 | 8/2004 |
| JP | 2006-224481 | 8/2006 |

* cited by examiner

*Primary Examiner* — Joshua D Zimmerman
(74) *Attorney, Agent, or Firm* — SOLARIS Intellectual Property Group PLLC

(57) ABSTRACT

A printing plate making apparatus which scans a recording medium by light beam in a predetermined pixel pitch, thereby engraving a surface of the recording medium to make a printing plate, wherein an upper surface of a convex portion of light power of the light beam engraving all or part of an adjacent region which is adjacent to a convex portion which is to be left in a convex shape on a surface of the recording medium is set to an threshold engraving energy or less, and light power of light beam in a vicinity region in vicinity of outer side of a region defined as the adjacent region is brought higher than light power in the adjacent region.

19 Claims, 31 Drawing Sheets

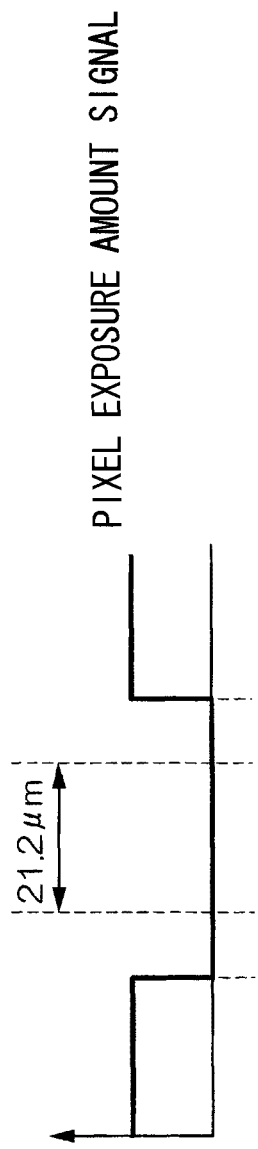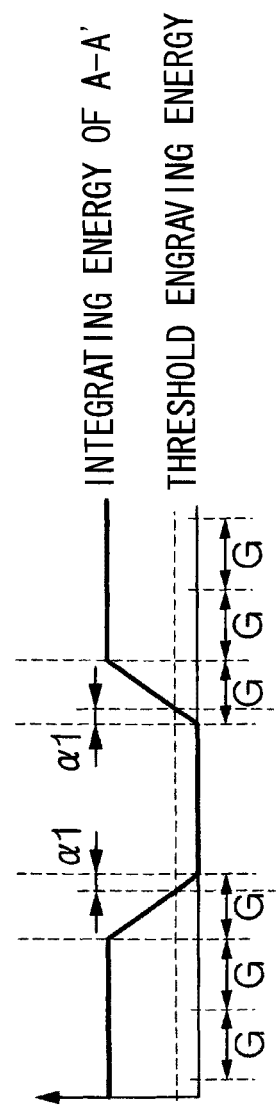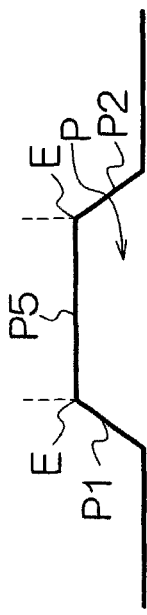

PIXEL EXPOSURE AMOUNT SIGNAL

INTEGRATING ENERGY OF A-A'
THRESHOLD ENGRAVING ENERGY

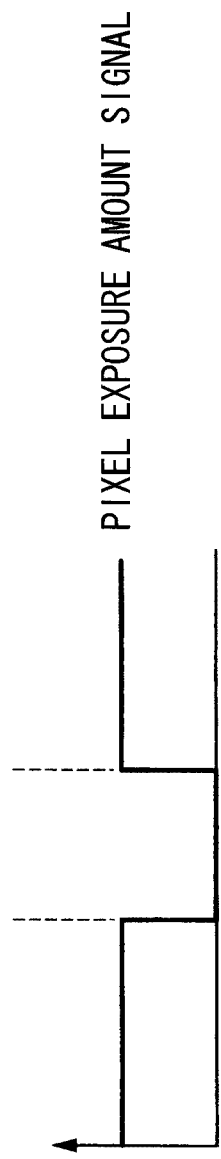
FIG. 12C PIXEL EXPOSURE AMOUNT SIGNAL
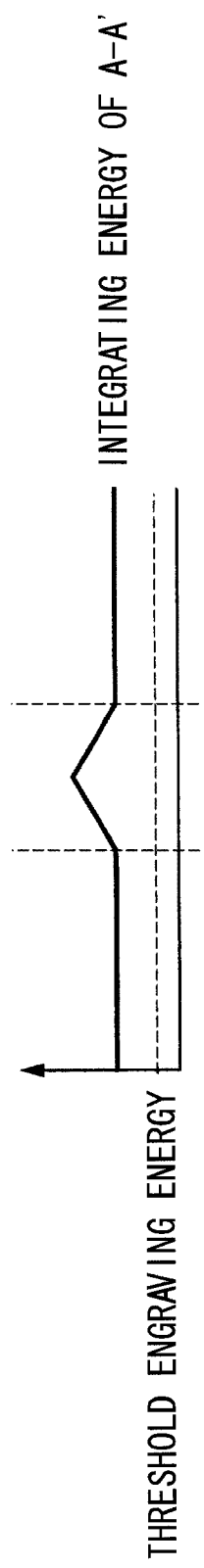
FIG. 12D INTEGRATING ENERGY OF A-A'
THRESHOLD ENGRAVING ENERGY
FIG. 12E

PIXEL EXPOSURE AMOUNT SIGNAL

INTEGRATING ENERGY OF A-A'

THRESHOLD ENGRAVING ENERGY

PIXEL EXPOSURE AMOUNT SIGNAL

INTEGRATING ENERGY OF A-A'
THRESHOLD ENGRAVING ENERGY

PIXEL EXPOSURE AMOUNT SIGNAL

INTEGRATING ENERGY OF A-A'
THRESHOLD ENGRAVING ENERGY

PIXEL EXPOSURE AMOUNT SIGNAL

INTEGRATING ENERGY OF A-A'

THRESHOLD ENGRAVING ENERGY

PIXEL EXPOSURE AMOUNT SIGNAL

INTEGRATING ENERGY OF A-A'
THRESHOLD ENGRAVING ENERGY

US 8,418,612 B2

PRINTING PLATE MAKING APPARATUS AND PRINTING PLATE MAKING METHOD

CROSS-REFERENCE TO RELATED APPLICATION

This application claims priority under 35 USC 119 from Japanese Patent Applications Nos. 2008-058160, 2008-058159, and 2009-009055, the disclosures of which are incorporated by reference herein.

BACKGROUND OF THE INVENTION

1. Field of the Invention

The present invention relates to a printing plate making apparatus and a printing plate making method.

2. Description of the Related Art

There is known a printing plate making apparatus including a drum being provided at its outer peripheral surface with a recording plate (recording medium) and being rotated in a horizontal scanning direction, and a two-dimensional image on the recording plate being engraved t (recorded) on the recording plate by scanning the recording medium in a vertical scanning direction that is perpendicular to the horizontal direction with a laser beam in accordance with image data of an image that is to be engraved.

In the above printing plate making apparatus, when a relief printing plate such as a flexographic printing plate and an intaglio printing plate such as a gravure is directly engraved by laser beam, it is required to satisfy both reproducibility of fine line or mesh point in shallow engraving (precision engraving) when engraving a narrow region and deep engraving (rough engraving) when engraving a wide region.

Since it is generally difficult to satisfy both two requirements at the same time, there is known a method in which laser beam having a small spot diameter for shallow engraving (precision engraving) and high power laser beam for deep engraving (rough engraving) are provided, and engraving is carried out using these laser beams separately (e.g., U.S. Pat. No. 6,150,629, U.S. Patent Application Laid-Open No. 2006/0279794A1, and Japanese Patent Application Laid-Open (JP-A) No. 2005-224481).

When printing is carried out using a relief printing plate such as a flexographic printing plate, if an edge shape of a convex portion formed on the plate is obtuse or a foundation which supports the convex portion is weak, printing density is varied by a pressing force against a printing medium, fine line or highlight point is not clearly printed or clear print is not carried out in some cases.

To reduce these problems, it is proposed to form a region remaining in convex shape such that a convex portion having rectangular cross section is formed on top of a foundation having a trapezoidal cross section (see JP-A No. 6-234262). To directly engraving a relief printing plate by laser beams at a higher speed, it is proposed to engrave a recording medium by exposing the recording medium to a light twice (see Japanese Patent No. 35562044).

SUMMARY OF THE INVENTION

However, it is required to engrave a recording plate more precisely. In addition, when a recording medium is engraved by scanned twice, in order to print clearly, it is required to make a shape of a region which is to be left in convex shape to a shape wherein a convex portion having rectangular cross section is formed on top of a foundation having a trapezoidal cross section.

The object that is to be achieved by the present invention is to solve the above problem.

A first aspect for achieving the above object relates to a printing plate making apparatus which scans a recording medium with a light beam at a predetermined pixel pitch, thereby engraving a surface of the recording medium to make a printing plate, wherein a light power of the light beam, which engraves all or part of a region which is adjacent to a convex portion which is to be left in a convex shape on a surface of the recording medium, is equal or less than a threshold engraving energy, and at a vicinity region in the vicinity of an outer side of the adjacent region, the light power of the light beam is increased to a level higher than the light power used in the adjacent region.

According to the printing plate making apparatus of the first aspect, the light power of the light beam emitted to all or part of the adjacent region which is adjacent to the convex portion in which the surface of the recording medium is to be left in a convex shape is reduced such that the exposure light of the light beam on the upper surface of the convex portion is equal or less than the threshold engraving energy. Accordingly, engraving on the upper surface of the convex portion is prevented or suppressed. Thus, the width of the upper surface of the convex portion may be brought closer to the desired width (desired width is secured or substantially secured).

At the vicinity region in the vicinity of the outer side of the region in the adjacent region where the energy is equal or smaller than the threshold engraving energy, the light power of the light beam is increased than the light power at the adjacent region and the engraving is carried out, and thus, the inclination angle of the side surface of the convex portion becomes acute. In other words, the shape of the convex portion becomes closer to a rectangular shape.

The width of the upper surface of the convex portion may be closer to the desired width and the shape of the convex portion becomes closer to the rectangular shape. That is, the convex portion is precisely engraved. Thus, reproducibility of fine line or meshed point on a printing medium printed by a recording medium made into a plate is improved.

By the apparatus of the first aspect, even when a diameter of light beam is large, a convex portion is engraved precisely. Even when a diameter of light beam is small, a convex portion is engraved more precisely than when an apparatus that does not have the technical feature of the apparatus of the first aspect.

According to the printing plate making apparatus of the first aspect, since the width of the upper surface of the convex portion can made to be closer to the desired width and the shape of the convex portion becomes closer to the rectangular shape, there is an excellent effect that a recording medium can be precisely engraved.

The increasing amount of intensity of the light power of light beam at the vicinity region is determined by taking into consideration the type of the recording medium or the other.

The width of the adjacent region and the vicinity region are determined by taking into consideration the size of the convex portion, a beam diameter of light beam, the pixel pitch, and the type of recording medium or the other.

A second aspect for achieving the above object relates to the printing plate making apparatus of the first aspect, wherein the adjacent region comprises one pixel or more.

In the printing plate making apparatus of the second aspect, since the width of the adjacent region is one pixel or more, the width of the upper surface of the convex portion may be brought closer to the desired width (the desired width is secured more reliably or substantially secured). Further, since the light power is controlled by pixel(s), it is easy to control the light power.

Therefore, the printing plate making apparatus of the second aspect has an excellent effect that the width of the upper surface of the convex portion may be brought closer to the desired width.

A third aspect for achieving the above object relates to the printing plate making apparatus of the first or second aspect, pulse exposure is carried out at a pulse width of one pixel or less and engraving is carried out at the vicinity region.

In the printing plate making apparatus of the third aspect, the recording plate is pulse-exposed with a pulse width of one pixel or less and engraved, thereby the inclination angle of the side surface of the convex portion becomes more acute. In other words, the shape of the convex portion is brought closer to the rectangular shape.

The pulse exposure mentioned here means control in which the light power of light beam is turned "OFF→ON→OFF", and the pulse width means a width (interval) during which the light power is ON.

A fourth aspect for achieving the above object relates to the third aspect, wherein the pulse width of the pulse exposure is 0.5 pixels or less.

In the printing plate making apparatus of the fourth aspect, since the pulse width of the pulse exposure is 0.5 pixels or less, the inclination angle of the side surface of the convex portion becomes more acute. In other words, the shape of the convex portion is brought closer to the rectangular shape.

A fifth aspect for achieving the above object relates to the printing plate making apparatus of the third aspect, wherein the pulse width of the pulse exposure is 0.25 pixels or less.

In the printing plate making apparatus of the fifth aspect, since the pulse width of the pulse exposure is 0.25 pixels or less, thereby the inclination angle of the side surface of the convex portion becomes more acute. In other words, the shape of the convex portion is brought closer to the rectangular shape.

The printing plate making apparatus of the third to fifth aspects exhibit an excellent effect that the shape of the convex portion may be brought closer to the rectangular shape.

A sixth aspect for achieving the above object relates to the printing plate making apparatus of any one of the first to fifth aspects, wherein the light beam engraving the recording medium is focused by an imaging lens after being emitted from a fiber array light source.

In the printing plate making apparatus of the sixth aspect, after the light beam is emitted from the fiber array light source, the light beam is focused by an imaging lens to engrave the recording medium. Therefore, as compared with an expensive light source such as a fiber laser and $CO_2$ laser, the cost of the printing plate making apparatus may be reduced.

Nevertheless, the width of the upper surface of the convex portion may be brought close to the desired width and the shape of the convex portion may be brought close to the rectangular shape. That is, the reproducibility of fine lines or meshed points on a printing medium printed by a recording medium after being engraved by light beam scanning may be improved.

According to the printing plate making apparatus of the sixth aspect, there is an excellent effect that cost may be reduced compared with a printing plate making apparatus having an expensive light source such as a fiber laser.

A seventh aspect for achieving the above object relates to a printing plate making method, the method comprising scanning a recording medium by light beam by a predetermined pixel pitch, thereby engraving a surface of the recording medium to make a printing plate, wherein a light power of the light beam engraving all or part of an adjacent region which is adjacent to a convex portion which is to be left in a convex shape on a surface of the recording medium is reduced to so as to be equal to or less than a threshold engraving energy, and the light power of a light beam for engraving a region in the vicinity of an outer side of the adjacent region is increased to a value higher than the light power used in the adjacent region.

According to the printing plate making method of the seventh aspect, the width of the upper surface of the convex portion may be brought close to the desired width and the shape of the convex portion may be brought close to the rectangular shape. Therefore, the convex portion is precisely engraved. Thus, the reproducibility of fine lines or meshed points on a printing medium printed by a recording medium that is made into a printing plate is improved.

The threshold engraving energy is a light energy of a light beam required for engraving a surface of the recording medium, and if the light energy is smaller than the threshold engraving energy, the recording medium is not be engraved. In other words, even if the recording medium is exposed to light beam having a light energy equal to or smaller than the threshold engraving energy, the surface of the recording medium is not engraved. The threshold engraving energy differs depending upon the type (material) of the recording medium.

According to the seventh aspect, since the width of the upper surface of the convex portion may be brought close to the desired width and the shape of the convex portion may be brought close to the rectangular shape, there is an excellent effect that the recording medium is precisely engraved.

An eighth aspect for achieving the above object relates to a printing plate making apparatus which scans a recording medium by a light beam at a predetermined pixel pitch, thereby engraving the recording medium to make a printing plate, wherein the light beam includes a first light beam and a second light beam, a light power of the first light beam is defined as $P1$, a light power of the second light beam is $P2$, and depths engraved by the respective light powers are $d1$ and $d2$; after the recording medium is scanned by one of the light beams in a predetermined pixel pitch to a first depth $d1$ or $d2$, a scanning line scanned by the one light beam is scanned by the other light beam; and the recording medium is engraved to a second depth $d1+d2$ which is deeper than the first depth.

An upstream end of a convex portion constituting an upper portion of a region where the recording medium is to be left in a convex shape is defined as an upstream reference position; light power control of the first light beam is carried out such that when the recording medium is scanned at a predetermined pixel pitch with the first light beam, from a first point separated away from the upstream reference position by m pixels upstream in the scanning direction or the vicinity thereof, to a second point which is separated away from the upstream reference position on the surface of the recording medium downstream in the scanning direction by n pixels, a light power of the first light beam is reduced linearly or substantially linearly from $P1$ so that at the upstream reference position or the vicinity thereof the light power of the first light beam is equal to or less than a threshold engraving energy. When the recording medium is scanned by the second light beam at a predetermined pixel pitch to engrave, from a third point separated away from the upstream reference position in the upstream in the scanning direction by $(2m+n) \times (P2/P1)$ pixels or the vicinity thereof, the light power of the second light beam is reduced linearly or substantially linearly from P2 such that it becomes the threshold engraving energy or less at the first point or the vicinity thereof.

According to the printing plate making apparatus of the eighth aspect, when scanning the recording medium by the first light beam at the predetermined pixel pitch and engraving at the first depth, from the first point that is a point separated away from the upstream reference position upstream in the scanning direction by m pixels or the vicinity thereof along the line segment connecting the first point in the first depth and the second point that is a point separated away from the upstream reference position in the surface of the recording medium downstream in the scanning direction by n pixels, the light power of the first light beam is reduced linearly or substantially linearly from P1, and the energy is set to be equal to or less than the threshold engraving energy at the upstream reference position or the vicinity thereof.

When the recording medium is scanned by the second light beam in the predetermined pixel pitch and engraved at the second depth, the light power of the second light beam is reduced linearly or substantially linearly from P2 along the line segment connecting the first point and the third point which is separated away from the upstream reference position upstream in the scanning direction by (2m+n)×(P2/P1) pixels or the vicinity thereof, and the energy is set to be equal to or less than the threshold engraving energy at the first point or the vicinity thereof.

By controlling the light power in the above described manner, the convex portion having a substantially rectangular cross section is formed on top of a foundation having a substantially trapezoidal cross section upstream in the scanning direction of the region which is to be left in a convex shape. For example, an inclined surface which is engraved by the second light beam is substantially straightly connected to an inclined surface of the foundation having the trapezoidal cross section upstream in the scanning direction when it is engraved by the first light beam.

Therefore, even if the recording medium is engraved by scanning twice and, the cross section shape of the region which is to be left in a convex shape may be brought close to a shape that a convex portion having a substantially rectangular cross section is formed on top of a foundation having a substantially trapezoidal cross section.

Accordingly, deviation of printing density in accordance with a pressure applied from a recording medium that is made into a printing plate (a printing plate) to a printing medium and failure of clearly printing a fine line or a high light point are prevented or suppressed, and therefore, clear printing can be carried out.

According to the printing plate making apparatus of the eighth aspect, when the recording medium is engraved by scanning twice, the shape of the region which is to be left in a convex shape may be brought close to a shape such that a convex portion having a substantially rectangular cross section is formed on top of a foundation having a substantially trapezoidal cross section.

A ninth aspect for achieving the above object relates to the printing plate making apparatus of the eighth aspect, wherein when engraving all or part of an adjacent region which is adjacent upstream in the scanning direction to a convex portion forming an upper portion of a region where a surface of the recording medium is to be left in a convex shape, a light power of the first light beam is reduced so as to be equal to or less than the threshold engraving energy, at the upper surface of the convex portion, and in a vicinity region which is in the vicinity of an outer side of an upstream side of the adjacent region in the scanning direction, the light power of the first light beam is set higher than the light power of the first beam when engraving along a line segment connecting the first point and the second point.

In the printing plate making apparatus of the ninth aspect, the light power of the first light beam emitted to all or part of the adjacent region which is adjacent to the convex portion upstream in the scanning direction is reduced such that the exposure of the light beam to the upper surface of the convex portion is carried out at an intensity equal to or less than the threshold engraving energy. Accordingly, engraving the upper surface of the convex portion is prevented or suppressed. Thus, the width of the upper surface of the convex portion is brought closer to the desired width.

At the vicinity region which is adjacent to the outer side upstream in the scanning direction of the region in the adjacent region where a light energy is set to be equal to or less than the threshold engraving energy, the region is engraved while increasing the light power of the first light beam higher than the light power of the first light beam when engraving along the line segment connecting the first point and the second point. Accordingly, the inclination angle of the side surface of the convex portion becomes acute. In other words, the shape of the convex portion becomes close to the rectangular shape.

Accordingly, the width of the upper surface of the convex portion formed on top of the foundation having a substantially trapezoidal cross section is brought close to the desired width, and the shape of the convex portion becomes close to the rectangular shape. That is, the convex portion is engraved precisely. Thus, the reproducibility of fine line or meshed point on a printing medium printed by a recording medium made into a printing plate is improved.

According to the printing plate making apparatus of the tenth aspect, the shape of the cross section of a convex portion formed on top of a foundation having a substantially trapezoidal cross section may be brought closer to the rectangular shape.

An eleventh aspect for achieving the above object relates to a printing plate making apparatus which scans a recording medium by a light beam at a predetermined pixel pitch, thereby engraving a surface of the recording medium to make a printing plate, wherein: the light beam includes a first light beam and a second light beam, a light power of the first light beam is P1, a light power of the second light beam is P2, and depths engraved by the respective light powers are d1 and d2; after scanning the recording medium with one of the light beams at a predetermined pixel pitch to engrave the recording medium to a first depth d1 or d2, a scanning line scanned by the one light beam is scanned by the other light beam and the recording medium is engraved to a second depth d1+d2 which is deeper than the first depth; a downstream end of a convex portion forming an upper portion of a region where the recording medium is to be left in a convex shape downstream in the scanning direction is defined as a downstream reference position; light power control of the light beam is carried out such that, when the recording medium is scanned at a predetermined pixel pitch with the first light beam, the light power of the first light beam is set to be equal to or greater than the threshold engraving energy at the downstream reference position or the vicinity thereof; from a fifth point separated from the downstream reference position downstream in the scanning direction by m pixels to a sixth point on a surface of the recording medium separated from the downstream reference position in the scanning direction by n pixels, the light power of the first light beam is increased linearly or substantially linearly, and is set to P1 at the fifth point or the vicinity thereof; and when the recording medium is scanned at a predetermined pixel pitch by the second light beam, a light power of the second light beam is equal to or greater than the threshold engraving energy at the fifth point or the vicinity thereof, and towards a seventh point separated from the fifth point and the downstream reference position downstream in the scanning direction by (2m+n)×(P2/P1) pixels, the light power is increased linearly or substantially linearly and set to P2 at the seventh point or the vicinity thereof.

According to the printing plate making apparatus of the eleventh aspect, when scanning the recording medium by the first light beam at a predetermined pixel pitch, thereby engraving the recording medium at a first depth, the light power of the first light beam is set so as to be equal or lower than the threshold engraving energy, and then, from the downstream reference position or the vicinity thereof the light power is increased linearly or substantially linearly along the line segment connecting the fifth point at the first depth which is separated from the downstream reference position downstream in the scanning direction by m pixels and the sixth point in the surface of the recording medium which is separated away from the downstream reference position upstream in the scanning direction by n pixels, and the light power is set to P1 at the fifth point or the vicinity thereof.

When scanning the recording medium by the second light beam at a predetermined pixel pitch and engraving the recording medium at a second depth, the light power of the second light beam is set so as to be equal or higher than the threshold engraving energy, from the fifth point or the vicinity thereof and then, the light power is increased linearly or substantially linearly along the line segment connecting the fifth point and the seventh point at the second depth separated away from the downstream reference position downstream in the scanning direction in (2m+n)×(P2/P1) pixels, and the light power is set to P2 at the seventh point or the vicinity thereof.

By controlling the light power in this manner, a convex portion having a substantially rectangular cross section is formed on top of a foundation having a substantially trapezoidal cross section downstream in the scanning direction of the region which is to be left in a convex shape. For example, an inclined surface which is engraved by the second light beam is substantially straightly connected to an inclined surface of the foundation having the trapezoidal cross section downstream in the scanning direction when it is engraved by the first light beam.

Therefore, even if the recording medium is engraved by scanning twice, the cross section shape of the region which is to be left in a convex shape may be brought close to a shape such that a convex portion having the substantially rectangular cross section is formed on top of a foundation having a substantially trapezoidal cross section.

Accordingly, for example, it can be prevented or suppressed that deviation of pressing force applied from a recording medium made into a printing plate to a printing medium causes printing density deviation and that fine lines or highlight points are not printed clearly, and therefore, clear printing may be carried out.

According to the printing plate making apparatus of the eleventh aspect, when the recording medium is engraved by scanning twice, the shape of the region which is to be left in a convex shape may be brought close into such a shape that a convex portion having a substantially rectangular cross section is formed on top of a foundation having a substantially trapezoidal cross section.

A twelfth for achieving the above object relates to the printing plate making apparatus of the eleventh aspect wherein a light power of the first light beam, which engraves all or part of an adjacent region which is adjacent to a convex portion downstream in the scanning direction of the convex portion which forms an upper portion of a region where a surface of the recording medium is to be left in a convex shape, is reduced so as to be equal or smaller than the value of the threshold engraving energy; at the upper surface of the convex portion, and in the vicinity region in vicinity of an outer side of an adjacent region upstream in the scanning direction, light power of the first light beam is increased higher than the light power of the first light beam when engraving along a line segment connecting the fifth point and the sixth point.

According to the printing plate making apparatus of the twelfth aspect, the light power of the first light beam emitted to all or a part of the adjacent region which is adjacent to the downstream in the scanning direction of the convex portion constituting the upper portion of the region where the surface of the recording medium is left in a convex shape is reduced such that the exposure of the light beam emitted to the upper surface of the convex portion becomes to be equal or less than the threshold engraving energy. Accordingly, engraving of the upper surface of the convex portion is prevented or suppressed. Thus, the width of the upper surface of the convex portion is brought closer to the desired width.

At the vicinity region which is in the vicinity of the outer side downstream in the scanning direction of the region in the adjacent region where the light energy is equal to or less than the threshold engraving energy, the region is engraved while increasing the light power of the first light beam as compared with the light energy when engraving along the line segment connecting the fifth point and the sixth point. Thus, the inclination angle of the side surface of the convex portion becomes acute. In other words, the shape of the convex portion becomes close to the rectangular shape.

Consequently, the width of the upper surface of the convex portion formed on top of the foundation having a substantially trapezoidal cross section is brought close to the desired width, and the shape of the convex portion becomes close to the rectangular shape. That is, the convex portion is engraved precisely. Thus, the reproducibility of fine lines or meshed points on a printing medium printed by a recording medium made into a printing plate is improved.

According to the printing plate making apparatus of the twelfth aspect, the shape of a cross section of a convex portion formed on top of a foundation having a substantially trapezoidal cross section may be brought closer to the rectangular shape.

A thirteenth aspect for achieving the above object relates to the printing plate making apparatus of any one of the eighth to twelfth aspects, wherein n is an integer from 1 to 3.

In the printing plate making apparatus of the thirteenth aspect, since the n is an integer from 1 to 3, the convex portion having the substantially rectangular cross section is formed to an appropriate height.

Thus, according to the printing plate making apparatus, the convex portion having the substantially rectangular cross section may be formed to an appropriate height.

According to a fourteenth aspect for achieving the above object relates to the printing plate making apparatus of any one of the eighth to thirteenth aspects wherein m is an integer from 5 to 30.

According to the printing plate making apparatus of the fourteenth aspect, since m is an integer from 5 to 30, the foundation having a substantially trapezoidal cross section is formed to an appropriate width.

According to the printing plate making apparatus of the fourteenth aspect, the foundation having a substantially trapezoidal cross section may be formed to the appropriate width.

A fifteenth aspect for achieving the above object relates to the printing plate making apparatus of any one of the eighth to fourteenth aspects, wherein the recording medium scanned by light beam in a horizontal scanning direction and a vertical scanning direction that is perpendicular to the horizontal direction, and light power control of the light beam is carried out when the recording medium is scanned at one or both of the horizontal scanning direction and vertical scanning direction.

According to the printing plate making apparatus of the fifteenth aspect, the recording medium is scanned by the light beam in the horizontal scanning direction and the vertical scanning direction perpendicular to the horizontal scanning direction. Consequently, the region which is to be left in a convex shape is formed into the substantially rectangular shape as viewed from above. On at least one side of the substantially rectangular shape, a convex portion having a substantially rectangular cross section is formed on top of a foundation having a substantially trapezoidal cross section.

Thus, according to the printing plate making apparatus, the region which is to be left in a convex shape is formed into the substantially rectangular shape as viewed from the above.

A sixteenth aspect for achieving the above object relates to a printing plate making method for engraving a surface of a recording medium to make a printing plate, the method comprising scanning a recording medium with a light beam at a predetermined pixel pitch, wherein a light beam includes a first light beam and a second light beam, a light power of the first light beam is $P1$, a light power of the second light beam is $P2$, and depths engraved by the respective light powers are $d1$ and $d2$; after the recording medium is scanned by one of the light beams at a predetermined pixel pitch to the first depth $d1$ or $d2$, a scanning line scanned by the one light beam is scanned by the other light beam, and the recording medium is engraved to a second depth $d1+d2$ which is deeper than the first depth; an upstream end of a convex portion forming an upper portion of a region where the recording medium is to be left in a convex shape upstream in the scanning direction is defined as an upstream reference position; light power control of the first light beam is carried out such that, when the recording medium is scanned at a predetermined pixel pitch with the first light beam, from a first point which is separated from the upstream reference position by m pixels in the scanning direction, or the vicinity thereof, to a second point on the surface of the recording medium separated from the upstream reference position by n pixels downstream in the scanning direction, a light power of the first light beam is reduced linearly or substantially linearly from $P1$ so that at the upstream reference position or the vicinity thereof the light power of the first light beam is equal to or less than a threshold engraving energy; and when the recording medium is scanned by the second light beam at a predetermined pixel pitch, from a third point or the vicinity thereof, the third point being separated from the upstream reference position by $(2m+n)\times(P2/P1)$ pixels in the scanning direction, the light power of the second light beam is reduced linearly or substantially linearly from $P2$ such that it becomes the threshold engraving energy or less at the first point or the vicinity thereof.

According to the printing plate making method of the sixteenth aspect, by engraving a recording medium (making the plate) according to the above manner, a convex portion having a substantially rectangular cross section is formed on top of a foundation having a substantially trapezoidal cross section upstream in the scanning direction of the region which is to be left in a convex shape. For example, an inclined surface which is engraved by the second light beam is substantially straightly connected to an inclined surface of the foundation having the trapezoidal cross section upstream in the scanning direction when it is engraved by the first light beam.

Therefore, even if the recording medium is engraved by scanning twice, the cross section shape of the region which is to be left in a convex shape may be brought close into such a shape that the convex portion having the substantially rectangular cross section is formed on top of the foundation having a substantially trapezoidal cross section.

Thus, it can be prevented or suppressed that printing density deviation is caused by deviation of pressing force applied to a recording medium that is made into a printing plate to a printing medium, and that a fine line or a highlight point is not printed clearly, and accordingly, clear printing may be carried out.

According to the printing plate making method of the sixteenth aspect, when the recording medium is engraved by scanning twice, the shape of the region which is to be left in a convex shape may be brought close to a shape of a convex portion having a substantially rectangular cross section and being formed on top of a foundation having a substantially trapezoidal cross section.

A seventeenth aspect for achieving the above object relates to the printing plate making method of the sixteenth aspect wherein when engraving all or part of an adjacent region which is adjacent upstream in the scanning direction to a convex portion forming an upper portion of a region where a surface of the recording medium is to be left in a convex shape, a light power of the first light beam is reduced so as to be equal to or less than the threshold engraving energy, at the upper surface of the convex portion, and in a vicinity region which is in the vicinity of an outer side of an upstream side of the adjacent region in the scanning direction, the light power of the first light beam is set higher than the light power of the first light beam when engraving along a line segment connecting the first point and the second point.

According to the printing plate making method of the seventeenth aspect, the light power of the first light beam emitted to all or a part of the adjacent region which is adjacent to the downstream in the scanning direction of the convex portion constituting the upper portion of the region where the surface of the recording medium is left in a convex shape is reduced such that the exposure of the light beam emitted to the upper surface of the convex portion becomes the threshold engraving energy or less. With this, the upper surface of the convex portion is prevented or suppressed from being engraved. Thus, the width of the upper surface of the convex portion is brought closer to the desired width.

At the vicinity region which is in the vicinity of the outer side upstream in the scanning direction of the region in the adjacent region where the light energy of the first light beam is equal to or less than the threshold engraving energy, the region is engraved while increasing the light power of the first light beam as compared with the light energy of the first beam when engraving along the line segment connecting the first point and the second point. Thus, the inclination angle of the side surface of the convex portion becomes acute. In other words, the shape of the convex portion becomes close to the rectangular shape.

Therefore, the width of the upper surface of the convex portion formed on top of the foundation having a substantially trapezoidal cross section is brought close to the desired width, and accordingly, the sectional shape of the convex portion becomes closer to a rectangular shape. That is, the convex portion is engraved precisely. Thus, the reproducibility of fine line or meshed point on a printing medium printed by a recording medium made into a printing plate according to this aspect is improved.

According to the printing plate making method, the shape of the cross section of the convex portion formed on top of the foundation having a substantially trapezoidal cross section may be brought closer to the rectangular shape.

An eighteenth for achieving the above object relates to a printing plate making method for engraving a surface of a recording medium to make a printing plate, the method comprising scanning a recording medium with a light beam at a predetermined pixel pitch, wherein a light beam includes a first light beam and a second light beam, a light power of the first light beam is P1, a light power of the second light beam is P2, and depths engraved by the respective light powers are d1 and d2; after the recording medium is scanned by one of the light beams at a predetermined pixel pitch to engrave to the first depth d1 or d2, a scanning line scanned by the one light beam is scanned by the other light beam, and the recording medium is engraved to a second depth d1+d2 which is deeper than the first depth; an upstream end of a convex portion forming an upper portion of a region where the recording medium is to be left in a convex shape upstream in the scanning direction is defined as an upstream reference position; when the recording medium is scanned at a predetermined pixel pitch by the first light beam, a light power of the first light beam is set to a threshold engraving energy or higher from the downstream reference position or the vicinity thereof, toward a fifth point separated from the downstream reference position downstream in the scanning direction by m pixels and toward a sixth point on a surface of the recording medium separated by n pixels from the downstream reference position in the scanning direction, the light power is increased linearly or substantially linearly so that the light power is P1 at the fifth point or the vicinity thereof, when the recording medium is scanned by the second light beam in a predetermined pixel pitch, a light power of the second light beam is set to the threshold engraving energy or higher from the fifth point or the vicinity thereof, and then, the light power is increased linearly or substantially linearly along a line segment connecting the fifth point and a seventh point separated away from the downstream reference position downstream in the scanning direction by $(2m+n) \times (P2/P1)$ pixels, and the light power of the second light beam is set to P2 at the seventh point or the vicinity thereof.

By engraving (making the plate) a recording medium according to the printing plate making method of the eighteenth aspect, a convex portion having a substantially rectangular cross section is formed on top of the foundation having a substantially trapezoidal cross section downstream in the scanning direction of the region which is to be left in a convex shape. For example, an inclined surface which is engraved by the second light beam is substantially straightly connected to an inclined surface of the foundation having the trapezoidal cross section downstream in the scanning direction when it is engraved by the first light beam.

Therefore, even if the recording medium is engraved by scanning twice, the cross section shape of the region which is to be left in a convex shape may be brought close to a shape of convex region including a foundation having a substantially trapezoidal cross section and a convex portion having a substantially rectangular cross section is formed on top thereof.

Thus, for example, it can be prevented or suppressed that deviation of printing density is caused by deviation of pressing force applied from a recording medium made into a printing plate to a printing medium and that a fine line or highlight point is not printed clearly, and clear printing may be carried out.

According to the printing plate making method of the eighteenth aspect, when the recording medium is engraved by scanning twice, the shape of the region which is to be left in a convex shape may be brought closer to a shape of a convex region including foundation having a substantially trapezoidal cross section and a convex portion having a substantially rectangular cross section formed on top thereof.

A nineteenth for achieving the above object relates to the printing plate making method of the eighteenth aspect wherein when engraving all or part of an adjacent region which is adjacent to a convex portion downstream in the scanning direction forming an upper portion of a region where a surface of the recording medium is to be left in a convex shape, a light power of the first light beam is reduced so as to be equal to or less than the threshold engraving energy, at the upper surface of the convex portion, and at the vicinity region in the vicinity of the outer side of the adjacent region upstream in the scanning direction, a light power of the first light beam is increased to be greater than the light energy, engraving along a line segment connecting the fifth point and the sixth point.

According to the printing plate making apparatus of the nineteenth aspect, the light power of the first light beam emitted to all or a part of the adjacent region which is adjacent to the downstream in the scanning direction of the convex portion constituting the upper portion of the region where the surface of the recording medium is to be left in a convex shape is reduced such that the exposure of the light beam emitted to the upper surface of the convex portion becomes the threshold engraving energy or less. Consequently, engraving of the upper surface of the convex portion is prevented or suppressed. Thus, the width of the upper surface of the convex portion is brought closer to a desired width.

At the vicinity region which is in the vicinity of the outer side downstream in the scanning direction of the region in the adjacent region where the light energy of the first light beam is equal to or less than the threshold engraving energy or less, the region is engraved while increasing the light power of the first light beam as compared when engraving along the line segment connecting the fifth point and the sixth point. Thus, the inclination angle of the side surface of the convex portion becomes acute. In other words, the shape of the convex portion becomes close to the rectangular shape.

According to the method of this aspect, the width of the upper surface of the convex portion formed on top of the foundation having a substantially trapezoidal cross section is brought close to the desired width, and the shape of the convex portion becomes close to the rectangular shape. That is, the convex portion is engraved precisely. Thus, the reproducibility of fine line or meshed point on a printing medium printed by a recording medium made into a printing plate according to this method is improved.

The threshold engraving energy is a light power (a light energy) of a light beam required for engraving a surface of the recording medium, and if the light power is smaller than the threshold engraving energy, the recording medium is not be engraved. In other words, even if the recording medium is exposed to a light beam equal to or less than the threshold engraving energy, the surface of the recording medium is not engraved. The threshold engraving energy differs depending upon the type or the material(s) of the recording medium.

According to the printing plate making method of the nineteenth aspect, the shape of a cross section of a convex portion formed on top of a foundation having a substantially trapezoidal cross section may be brought closer to a rectangular shape.

BRIEF DESCRIPTION OF THE DRAWINGS

FIG. 10C shows a pixel exposure amount signal of laser beam, FIG. 10D is a graph showing integrating energy, of light power of laser beam of cross section taken along the A-A line in FIG. 10B, and FIG. 10E schematically shows a cross section shape of a convex fine line P taken along the A-A' in FIG. 10B.

FIG. 12C shows a pixel exposure amount signal of laser beam, FIG. 12D is a graph showing integrating energy, of light power of laser beam of cross section taken along the A-A' line in FIG. 12B, and FIG. 12E is a schematic diagram showing a cross section shape of a convex fine line P taken along the line A-A' in FIG. 12B.

DESCRIPTION OF THE PREFERRED EMBODIMENTS

1. Exemplary Embodiment 1

A structure of a printing plate making apparatus 11 according to an exemplary embodiment of the present invention will be explained. The printing plate making apparatus 11 rotates, in a horizontal scanning direction, a drum 50 having an outer peripheral surface to which a recording plate F (recording medium) is attached, emits a plurality of laser beams in accordance with image data of an image to be engraved (recorded) on the recording plate F, scans an exposure head 30 in a vertical scanning direction that is perpendicular to the horizontal direction at predetermined pitch, engraves (records) a two-dimensional image on the recording plate at high speed, and makes a relief printing plate.

When a narrow region (fine line or meshed point) is to be left, the recording plate F is engraved shallowly (precisely engraved), and when a wide region is to be left, the recording plate F is deeply engraved (roughly engraved).

Figure 1:
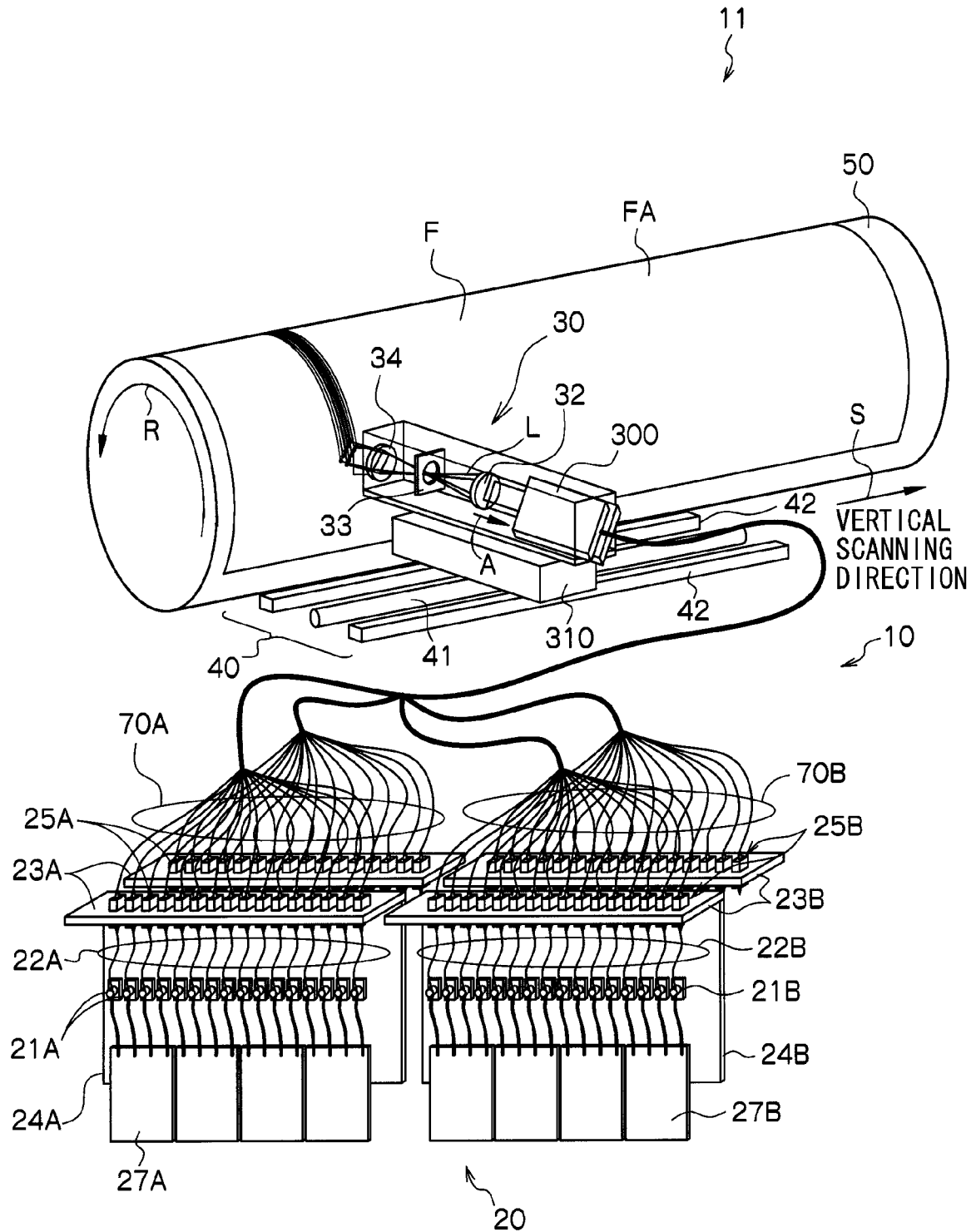
FIG. 1 is a schematic diagram (perspective view) of a structure showing a printing plate making apparatus according to an exemplary embodiment of the present invention.

FIG. 1 is a schematic diagram of a structure (perspective view) showing the printing plate making apparatus 11. As shown in FIG. 1, the printing plate making apparatus 11 includes the drum 50 to which a recording plate F is attached. The recording plate F is engraved by means of laser beam and an image is recorded on the recording plate F. The drum 50 is rotated and driven in the direction of the arrow R shown in FIG. 1 so that the recording plate F is moved in the horizontal scanning direction. The printing plate making apparatus 11 also includes a laser recording device 10. The laser recording device 10 includes a light source unit 20 as a fiber array light source which produces a plurality of laser beams, the exposure head 30 which exposes the recording plate F to the plurality of laser beams produced by the light source unit 20, and an exposure head moving portion 40 which moves the exposure head 30 along the vertical scanning direction. A rotation direction R of the drum 50 is the horizontal scanning direction, and a direction (details will be described later) in which the exposure head 30 is moved along an axial direction (longitudinal direction) of the drum 50 shown by arrow S is the vertical scanning direction.

The light source unit 20 includes 32 semiconductor lasers 21A and 32 semiconductor lasers 21B (total 64 semiconductor lasers) comprising broad area semiconductor lasers to which one ends of optical fibers 22A and 22B are respectively coupled, light source substrates 24A and 24B on which the semiconductor lasers 21A and 21B are disposed, adapter substrates 23A and 23B which are vertically mounted on one ends of the light source substrates 24A and 24B and which are provided with a plurality of (as many as the semiconductor lasers 21A and 21B) adapters of SC-type light connectors 25A and 25B, and LD driver substrates 27A and 27B which are horizontally mounted on the other ends of the light source substrates 24A and 24B and which are provided with an LD driver circuit 26 (see FIG. 6) for driving the semiconductor lasers 21A and 21B in accordance with image data of an image to be engraved (recorded) on the recording plate F.

The SC-type light connectors 25A and 25B are provided on the other ends of the optical fibers 22A and 22B, and the SC-type light connectors 25A and 25B are connected to adapter substrates 25A and 25B. Therefore, laser beams emitted from the semiconductor lasers 21A and 21B are transmitted to the SC-type light connectors 25A and 25B connected to the adapter substrates 23A and 23B through the optical fibers 22A and 22B.

Figure 6:
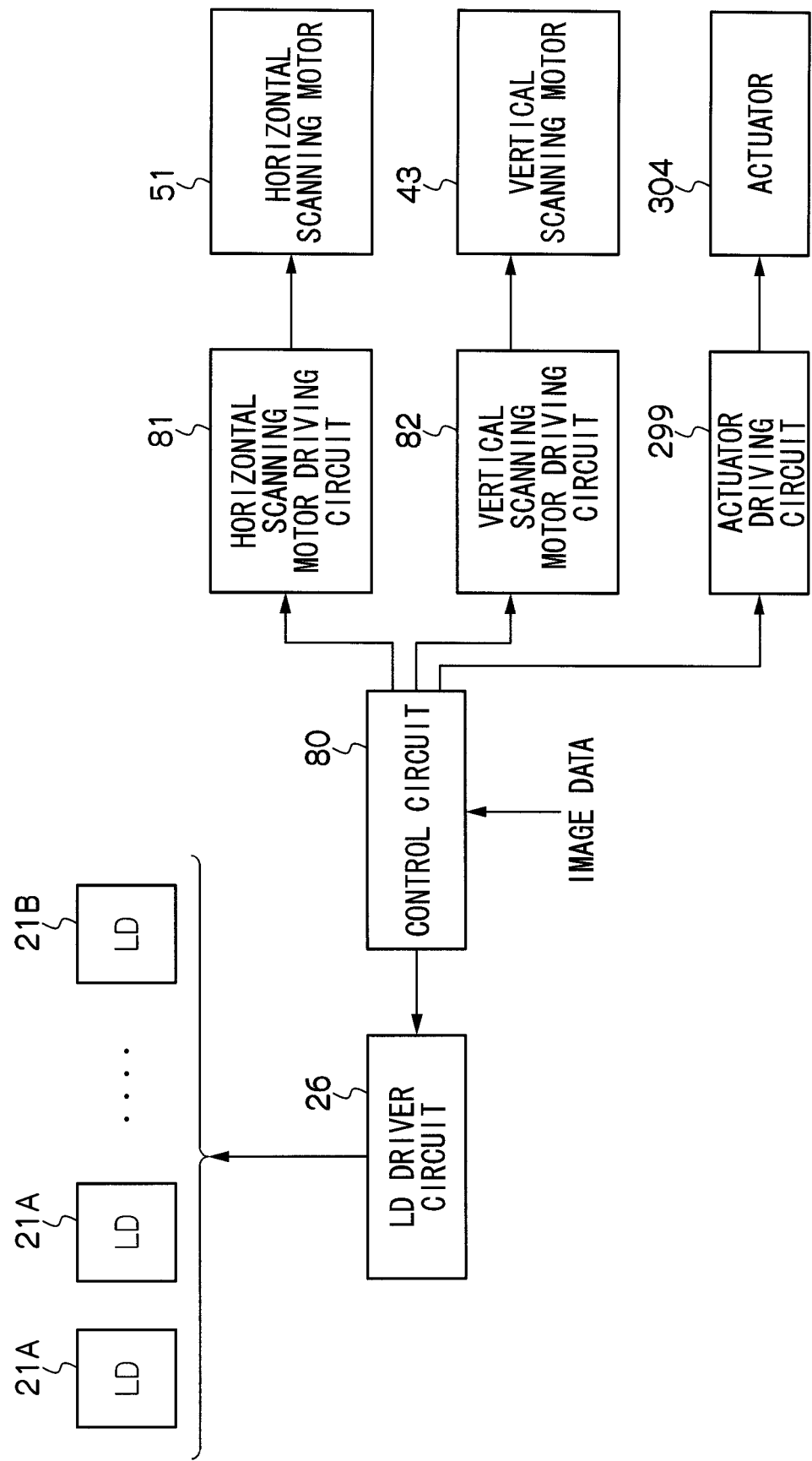
FIG. 6 is a block diagram showing a structure of a control system of the printing plate making apparatus.

Output terminals for driving signals of the semiconductor lasers 21A and 21B in the LD driver circuit 26 provided on the LD driver substrates 27A and 27B are respectively connected to the semiconductor lasers 21A and 21B, and driving operations of the semiconductor lasers 21A and 21B are individually controlled by the LD driver circuit 26 (see FIG. 6).

Figure 2:
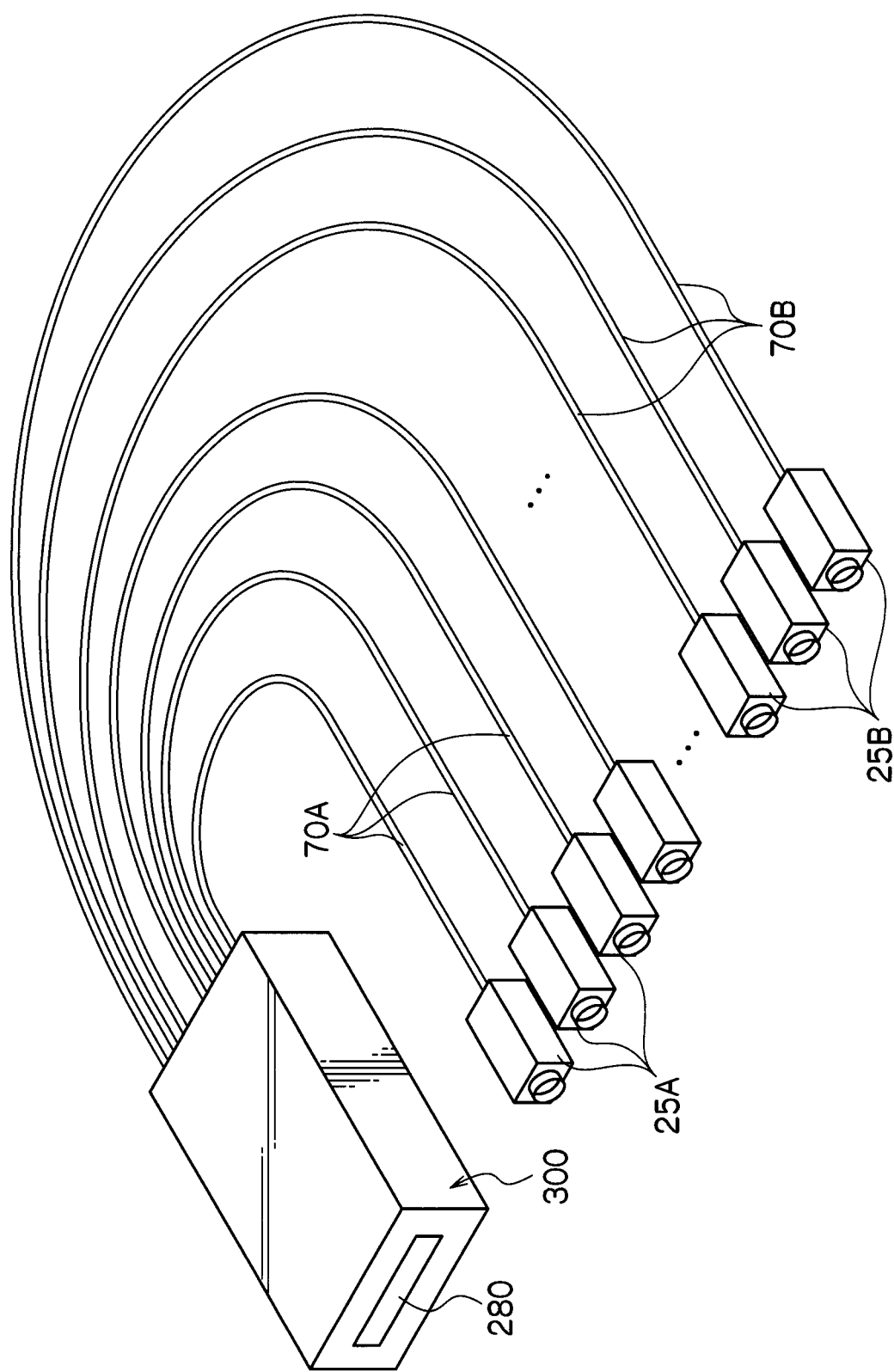
FIG. 2 is a perspective view of a fiber array portion and optical fibers of a laser recording device.

The exposure head 30 includes a fiber array portion 300 (see FIG. 2) which collectively emits laser beams emitted from the plurality of semiconductor lasers 21A and 21B. Laser beams emitted from the semiconductor lasers 21A and 21B are transmitted to the fiber array portion 300 through a plurality of optical fibers 70A and 70B connected to the SC-type light connectors 25A and 25B connected to the adapter substrates 23A and 23B.

Figure 3:
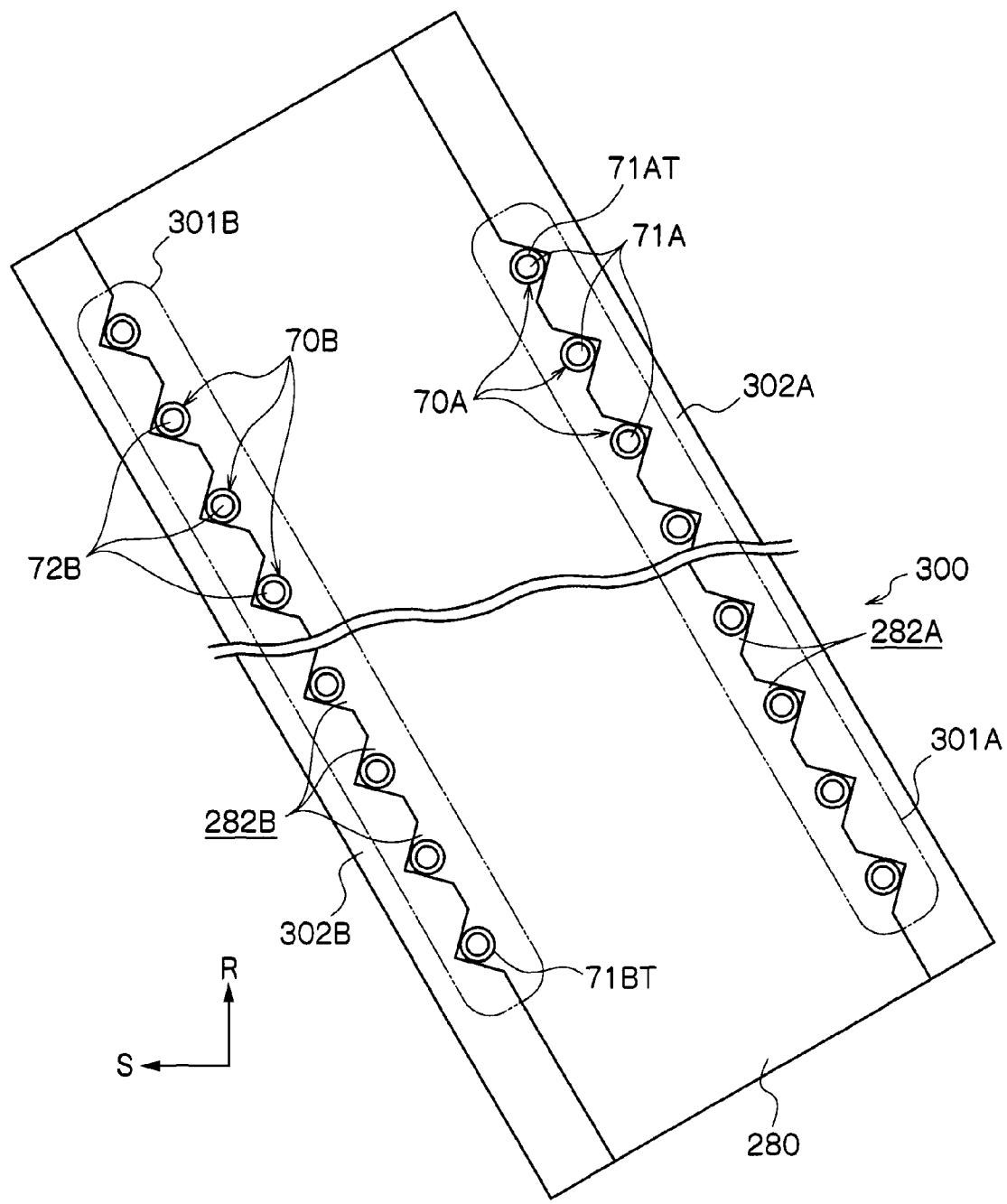
FIG. 3 is a schematic diagram showing a light-exposing portion of the fiber array portion.

FIG. 3 shows a light-exposing portion 280 (see FIG. 2) of the fiber array portion 300 as viewed in the direction of the arrow A shown in FIG. 1. As shown in FIG. 3, the light-exposing portion 280 of the fiber array portion 300 includes two pedestals 302A and 302B. V-grooves 282A and 282B as many as (32) the semiconductor lasers 21A and 21B are formed in one surfaces of the pedestals 302A and 302B, respectively such that the grooves are adjacent at predetermined distances from one another. In the pedestals 302A and 302B, the V-grooves 282A and 282B are opposed to each other.

Optical fiber ends 71A of the other ends of the optical fibers 70A are fitted into the V-grooves 282A of the pedestal 302A one each. Similarly, optical fiber ends 71B of the other ends of the optical fibers 70B are fitted into the V-grooves 282B of the pedestal 302B one each. Therefore, a plurality of, in this exemplary embodiment 64 (32×2) laser beams emitted from the semiconductor lasers 21A and 21B are simultaneously emitted from the light-exposing portion 280 of the fiber array portion 300.

That is, the fiber array portion 300 of the exemplary embodiment includes two lines of optical fiber end groups 301A and 301B in which a plurality of (in this exemplary embodiment, total 64 (32×2)) optical fiber ends 71A and 72B are straightly arranged in a predetermined direction. The optical fiber end groups 301A and 301B are provided parallel in a direction intersecting with the predetermined direction.

Figure 4:
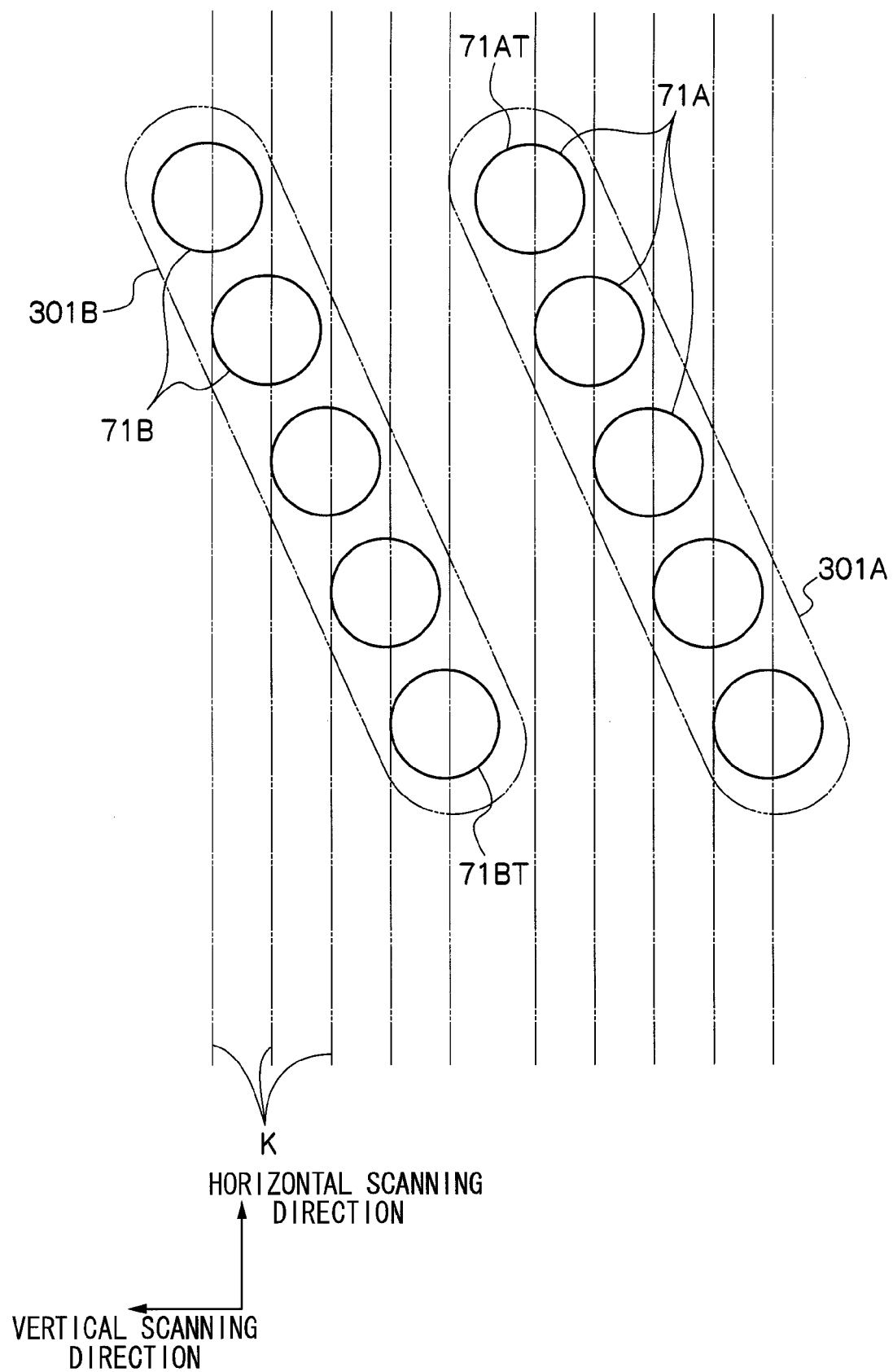
FIG. 4 is a diagram for explaining disposition positions and scanning lines of optical fiber ends.

As shown in FIGS. 1 and 3, in the laser recording device 10 of the exemplary embodiment, the predetermined direction of the fiber array portion 300 (exposure head 30) having the above-described structure is inclined with respect to the vertical scanning direction. As shown in FIGS. 3 and 4, the optical fiber end group 301A and the optical fiber end group 301B are arranged such that they are not overlapped each other in the vertical scanning direction as viewing the fiber array portion 300 in the horizontal scanning direction.

As shown in FIG. 1, a collimator lens 32, an opening member 33 and an imaging lens 34 are arranged in this order on the exposure head 30 from the side of the fiber array portion 300. The opening member 33 is disposed such that its opening is located at a far field as viewed from the fiber array portion 300. With this, equal light amount limiting effect may be applied to all of laser beams emitted from the optical fiber ends 71A and 72B of the plurality of optical fibers 70A and 70B in the fiber array portion 300.

In this exemplary embodiment, to obtain high output laser beams, multi-mode optical fibers having relatively large core diameters are applied to the optical fibers 22A and 22B. More specifically, in this exemplary embodiment, the core diameter is 105 μm. The semiconductor lasers 21A and 21B having the maximum output of 8.5 w (6397-L3) are used. Core diameters of the optical fibers 70A and 70B are 105 µm.

Figure 8:
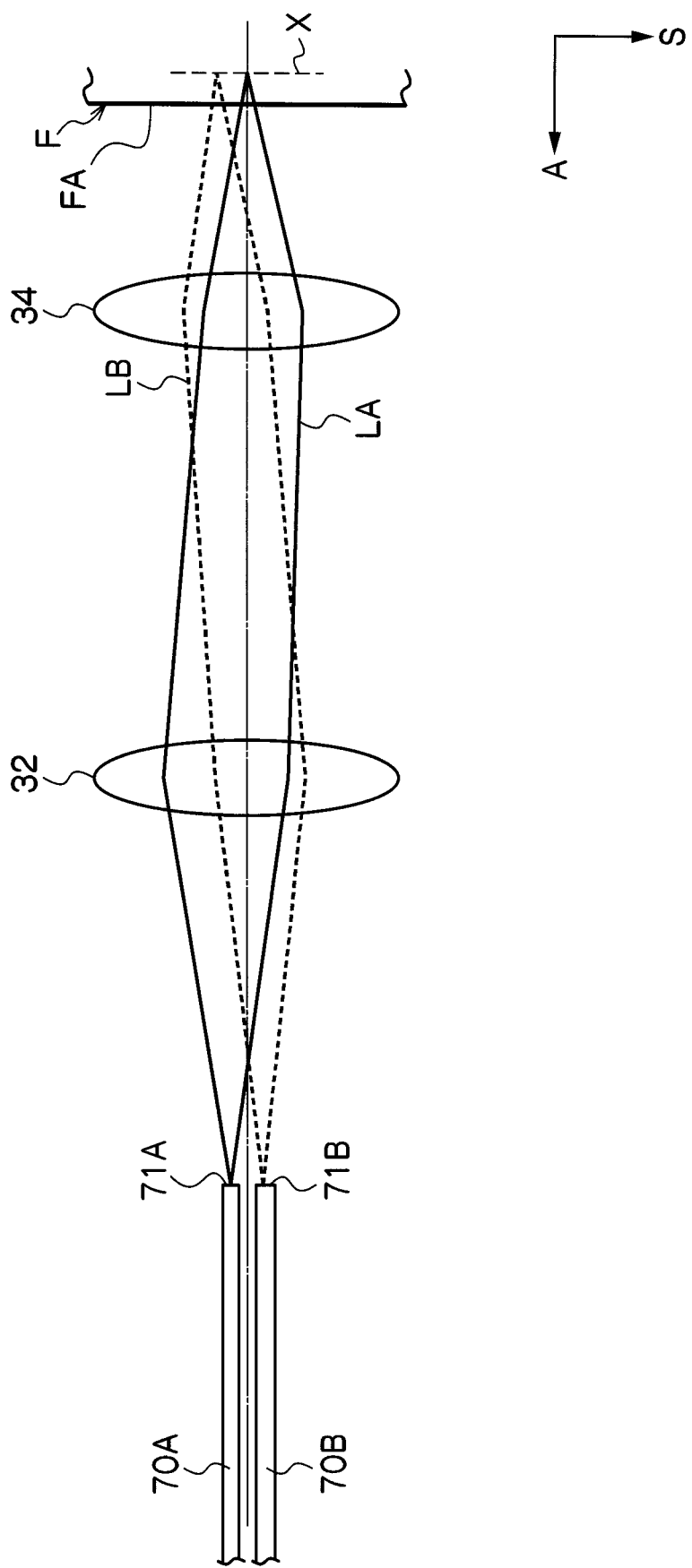
FIG. 8 is a schematic explanatory diagram showing an essential portion of an exposure head and emitted laser beam.

As shown in FIG. 8, a laser beam is imaged near an exposure surface (surface) FA of the recording plate F by imaging means comprising a collimator lens 32 and an imaging lens 34 (opening member 33 is not shown in FIG. 8). In this exemplary embodiment, it is preferable that an imaging position (imaging position) X is set on an exposure surface FA in terms of fine line reproducibility. A laser beam emitted from the optical fiber end 71A (optical fiber end group 301A) is defined as a laser beam LA, and a laser beam emitted from the optical fiber end 72B (optical fiber end group 301B) is defined as a laser beam LB. When it is unnecessary to distinguish both the laser beams, it is simply described as "laser beam".

The optical fiber ends 71B of the end of the optical fiber end group 301B is arranged next to the optical fiber end 71A of the end of the optical fiber end group 301A (see FIG. 3 also). In FIG. 4, the number of the optical fiber ends 71A and 72B is lower than the actual number so that the drawing may be understood easily.

Figure 5:
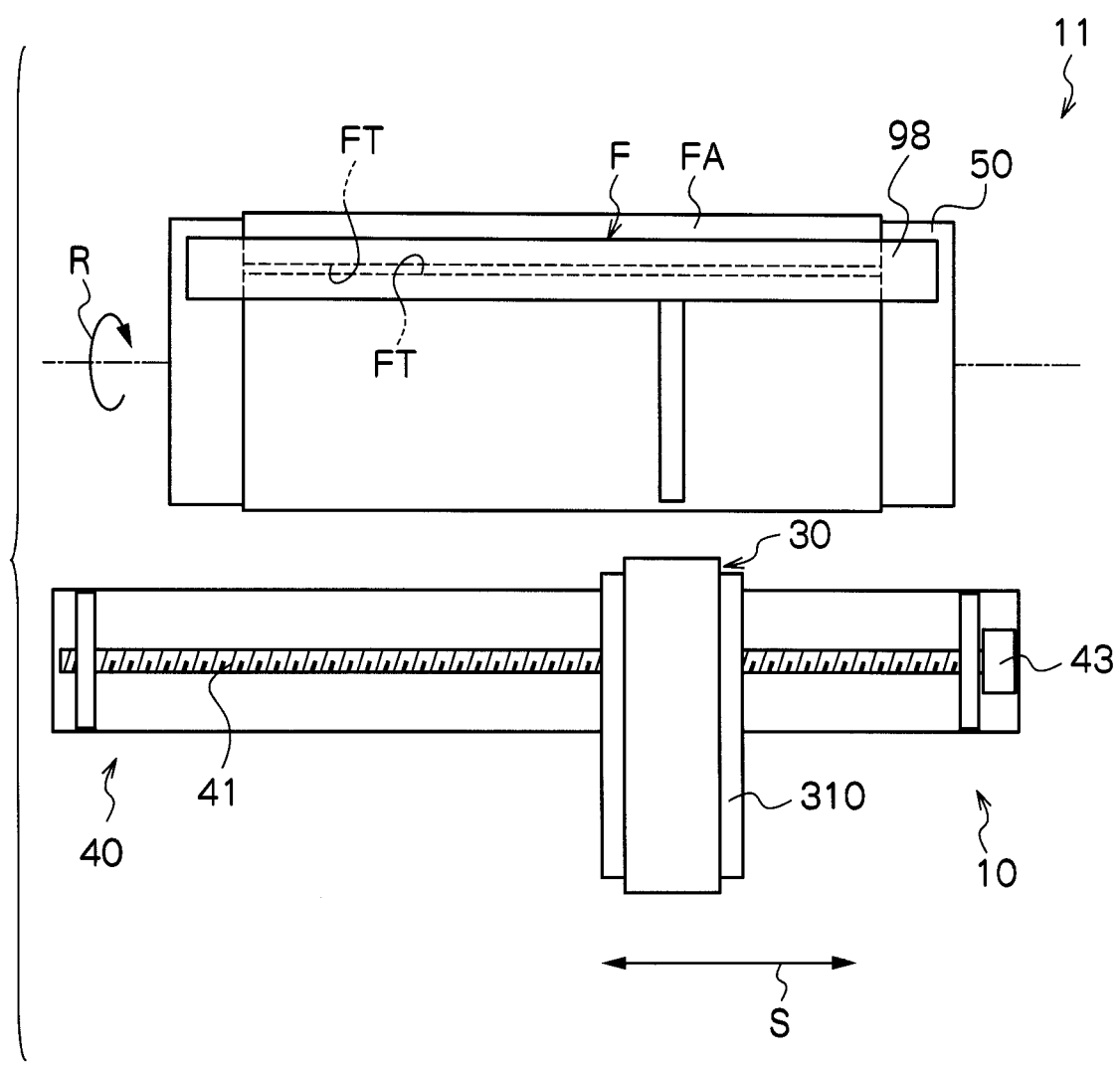
FIG. 5 is a plan view of the printing plate making apparatus as viewed from above.

As shown in FIG. 5, the recording plate F which is engraved by laser beam and on which an image is to be recorded is attached to an outer peripheral surface of the drum 50 which is rotated and driven in the direction of the arrow R. The recording plate F is attached to the outer peripheral surface of the drum 50 by a band-like chuck member 98 in which a rotational axial direction of the drum 50 is the longitudinal direction. More specifically, the chuck member 98 is attached to the drum 50 such that butted portions between the ends FT of the recording plate F are pressed from above and with this, the recording plate F is attached to the outer peripheral surface of the drum 50. The portion of the chuck member 98 is non-recording region.

As shown in FIGS. 1 and 5, the exposure head moving portion 40 includes a ball screw 41 and two rails 42 (see FIG. 1) disposed such that the longitudinal direction extends along the vertical scanning direction. By operating a vertical scanning motor 43 which rotates and drives the ball screw 41, a pedestal 310 provided with the exposure head 30 may be moved in the vertical scanning direction in a state where the pedestal 310 is guided by the rails 42. By operating a horizontal scanning motor 51 (see FIG. 6), the drum 50 may be rotated in the direction of the arrow R in FIG. 1 and with this, horizontal scanning is carried out. The exposure head 30 is provided on the pedestal 310.

In this exemplary embodiment, exposing and scanning operations are carried out by 64 laser beams LA and LB at a time as described above.

Next, a structure of a control system of the printing plate making apparatus 11 (see FIG. 1) of the exemplary embodiment will be described.

As shown in FIG. 6, the control system of the printing plate making apparatus 11 the LD driver circuit 26 which drives the semiconductor lasers 21A and 21B in accordance with image data, a horizontal scanning motor driving circuit 81 which drives the horizontal scanning motor 51, a vertical scanning motor driving circuit 82 which drives the vertical scanning motor 43, an actuator driving circuit 299 which drives an actuator 304, and a control circuit 80 which controls the horizontal scanning motor driving circuit 81, the vertical scanning motor driving circuit 82 and the actuator driving circuit. Image data indicative of an image to be engraved (recorded) in the recording plate F is supplied to the control circuit 80.

Figure 7:
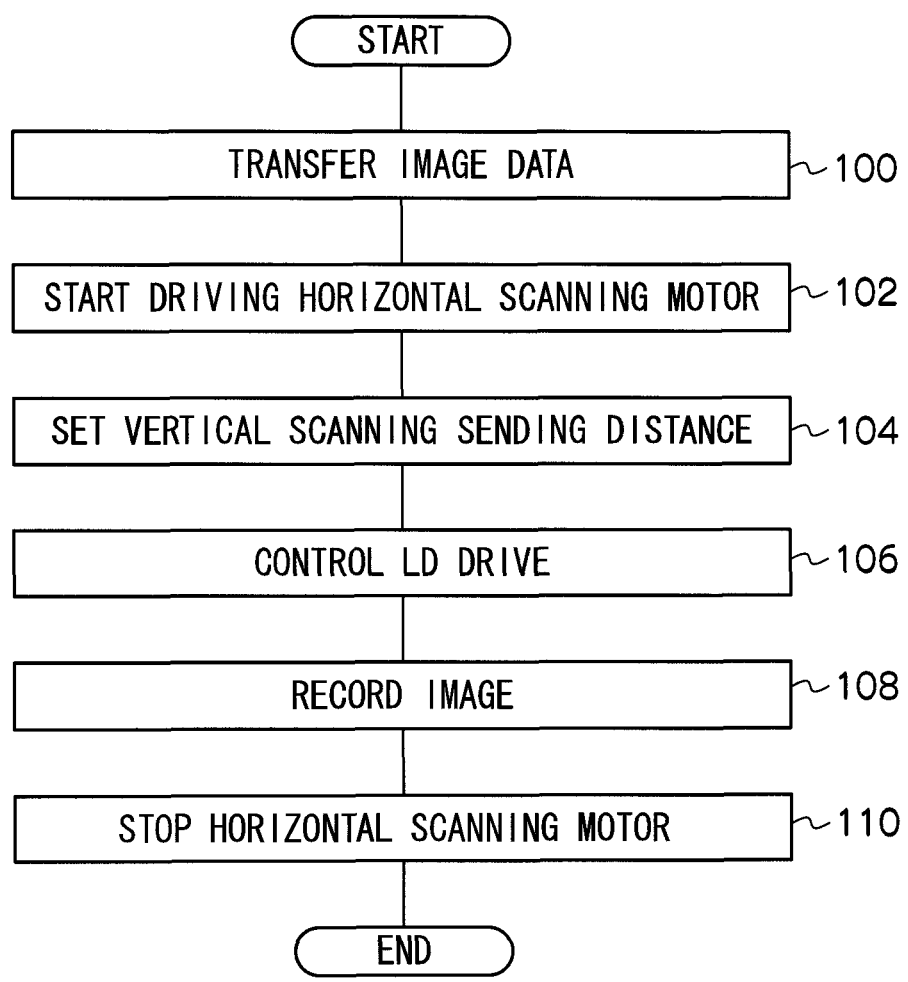
FIG. 7 is a flowchart showing a general outline of processing for recording an image by a laser recording device.

Next, a general outline of procedure for engraving (recording) on the recording plate F by the printing plate making apparatus 11 (see FIG. 1) constituted as described above will be described. FIG. 7 is a flowchart showing a flow of processing when an image is recorded by the printing plate making apparatus 11.

As shown in FIG. 7, image data of an image to be engraved (recorded) on the recording plate F is transferred to the control circuit 80 from an image memory (not shown) which temporarily stores the image data (step 100). The control circuit 80 supplies an adjusted signal to the LD driver circuit 26, the horizontal scanning motor driving circuit 81, the vertical scanning motor driving circuit 82, and the actuator driving circuit 299 based on transferred image data, resolution data indicative of predetermined resolution of a recorded image and data indicative of shallow engraving and deep engraving.

Next, the horizontal scanning motor driving circuit 81 controls the horizontal scanning motor 51 such that the drum 50 rotates in the direction of the arrow R in FIG. 1 at a rotation speed based on a signal supplied from the control circuit 80 (step 102).

The vertical scanning motor driving circuit 82 sets a sending distance of the exposure head 30 in the vertical scanning direction by the vertical scanning motor 43 (step 104).

Next, the LD driver circuit 26 controls the driving operations of the semiconductor lasers 21A and 21B in accordance with image data (step 106).

The laser beams LA and LB emitted from the semiconductor lasers 21A and 21B are emitted from the optical fiber ends 71A and 72B of the fiber array portion 300 through the optical fibers 22A and 22B, the SC-type light connectors 25A and 25B and the optical fibers 70A and 70B, the laser beams are brought into substantially parallel pencils of light by the collimator lens 32 and then, the light amount is limited by the opening member 33, and an image is formed (focused) near the exposure surface FA of the recording plate F on the drum 50 through the imaging lens 34.

In this case, beam spots are formed on the recording plate F in accordance with laser beams LA and LB emitted from the semiconductor lasers 21. By these beam spots, the exposure head 30 is sent in the vertical scanning direction at the sending distance pitch which is set in the step 104 described above, and a two-dimensional image of resolution indicated by the resolution data is engraved (formed) on the recording plate F by rotation of the drum 50 started by the step 102 described above (step 108).

If the engraving (recording) operation of the two-dimensional image on the recording plate F is completed, the horizontal scanning motor driving circuit 81 stops the rotation of the horizontal scanning motor 51 (step 110) and then, this processing is completed.

Next, light power control of the laser beams LA and LB in step 108 will be described, and operation and effect of the exemplary embodiment will be described.

As shown in FIG. 4, if the optical fiber end group 301A, the optical fiber end group 301B are viewed in the horizontal scanning direction, a distance between the optical fiber ends 71A and 72B, i.e., a distance (pixel pitch) between the scanning lines K is 10.58 µm (resolution 2400 dpi), and in other words, one pixel is 10.58 µm.

A case where a convex fine line P in which a surface FA of the recording plate F is left in a convex shape is formed will be described. In the convex fine line P, the vertical scanning direction is a longitudinal direction, and a desired width (width in the horizontal scanning direction) is 21.2 µm.

First, a case where a spot diameter D of laser beam is defined as $\phi$20 µm will be described using FIGS. 9A to 11C.

Figure 9A:
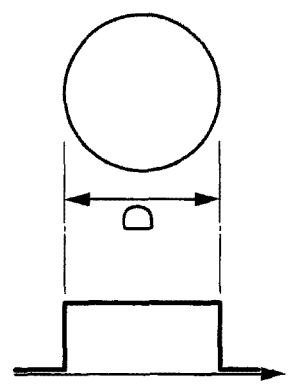
FIG. 9A is a graph showing light power of center cross section that shows light power control to which the invention is not applied and a spot diameter (spot shape) of laser beam when a beam diameter D is 20 μm.
Figure 9B:
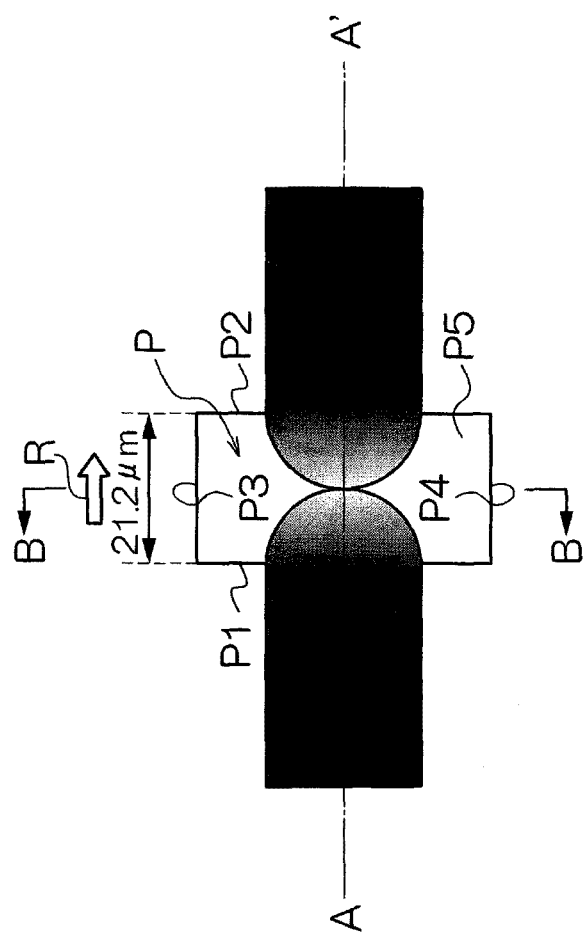
FIG. 9B is a schematic diagram showing light power variation when scanning is carried out by laser beam having the spot diameter (spot shape) shown in FIG. 9A to form a convex fine line (pixel region to be left) of 21.2 μm.
Figure 9C:
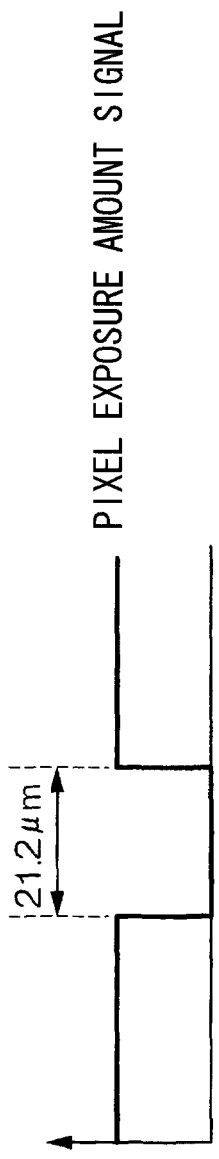
FIG. 9C shows a pixel exposure amount signal of laser beam.
Figure 9D:
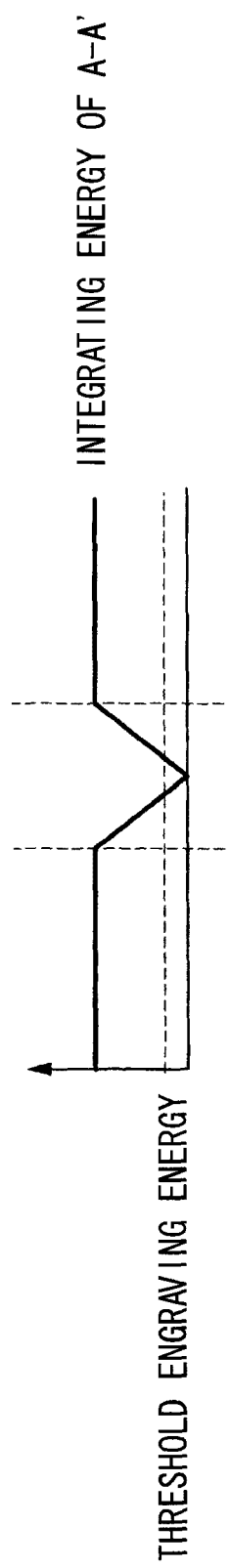
FIG. 9D is a graph showing integrating energy, of light power of laser beam of cross section taken along the A-A line in FIG. 9B.
Figure 9E:
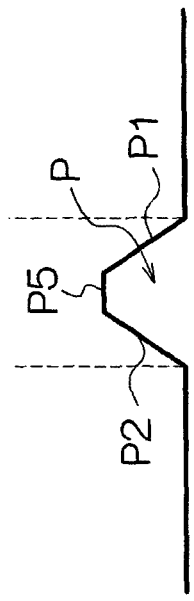
FIG. 9E is a schematic diagram showing a cross section shape of a convex fine line P taken along the line A-A' in FIG. 9B.
Figure 10B:
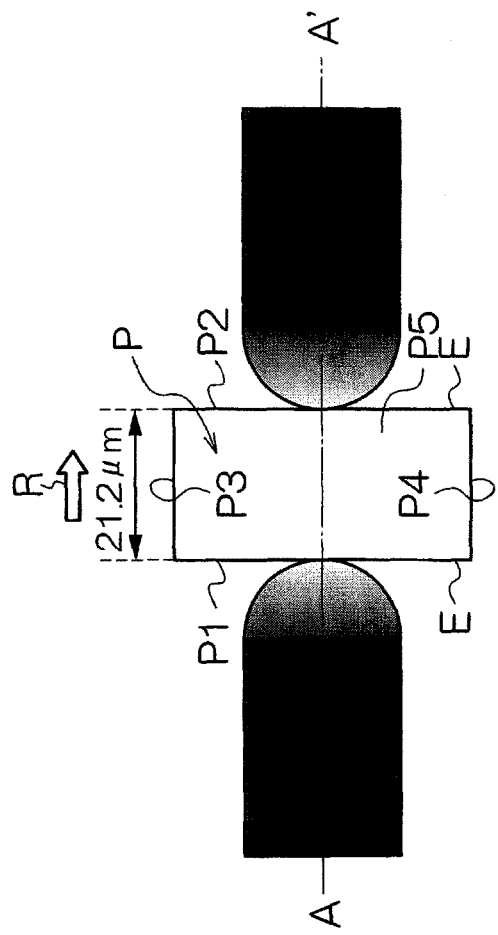
FIG. 10B is a graph showing a light power of center cross section, FIG. 10C schematically shows light power variation when scanning is carried out using laser beam of a spot diameter (spot shape) shown in FIG. 10A and a convex fine line (pixel region to be left) of 21.2 μm is formed.
Figure 10A:
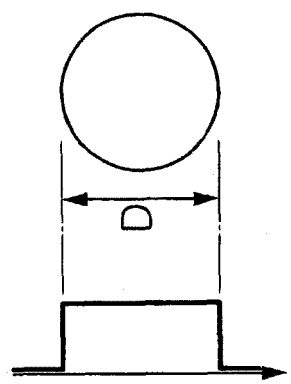
FIG. 10A shows light power control to which the invention is not applied and a spot diameter (spot shape) of laser beam when a beam diameter D is 20 μm.
Figure 11A:
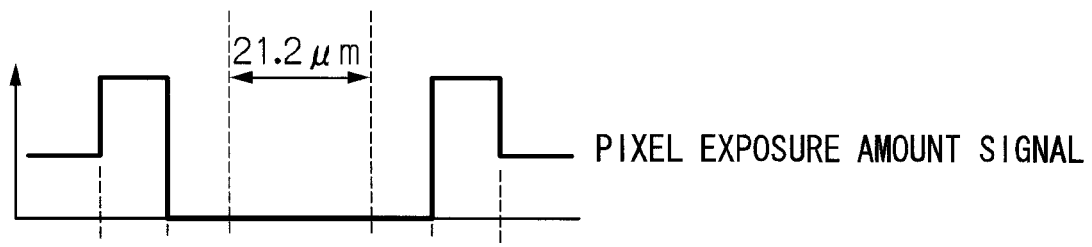
FIG. 11A shows light power control to which the invention is applied and a pixel exposure amount signal of laser beam when beam diameter D is 20 μm.
Figure 11B:
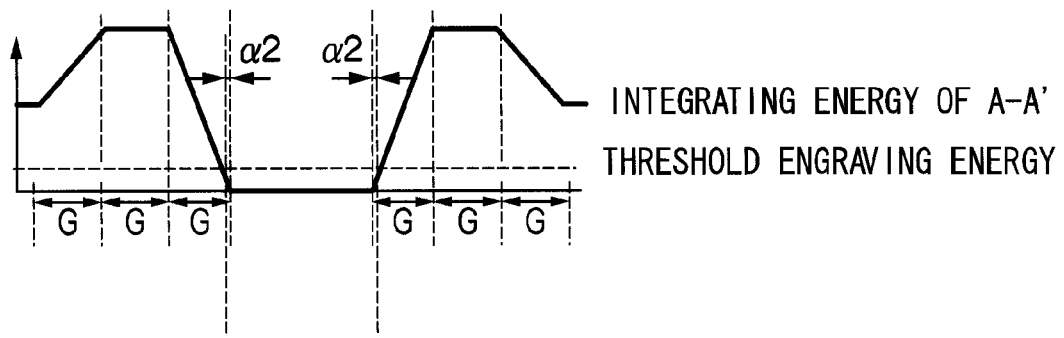
FIG. 11B is a graph showing integrating energy, of light power of laser beam of cross section taken along the line A-A in FIG. 11B, and FIG. 11C schematically shows a cross section shape of a convex fine line P taken along A-A' in FIG. 11B.
Figure 11C:
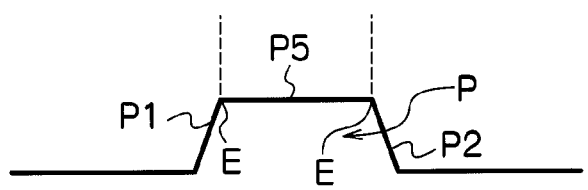

FIGS. 9A and 10A are schematic diagrams showing the spot diameter (spot shape) of laser beam and graphs showing light power distribution of center cross section. FIGS. 9B and 10B schematically show light power variation when scanning is carried out by laser beam of the spot diameter (spot shape) shown in FIGS. 9A and 10A to form convex fine lines P of 21.2 μm. As the color is denser, the light power is stronger, and as the color is lighter, the light power is weaker. FIGS. 9C and 10C shows pixel exposure amount signals of laser beams. FIGS. 9D and 10D are graphs showing integrating energy, of light power of cross section taken along the A-A lines in FIGS. 9B and 10B. FIGS. 9E and 10E schematically show cross section shapes of the convex fine line P taken along the A-A lines in FIGS. 9B and 10B. In the drawings, G represents a width of one pixel (10.58 μm). FIGS. 11A, 11B and 11C only show diagrams corresponding to FIGS. 9C to 9E and 10C to 10E. The direction of the arrow R is the scanning direction of laser beam (horizontal scanning direction in this exemplary embodiment).

An threshold engraving energy is an energy, of laser beam required for engraving a surface of a recording plate F, and if energy is smaller than the threshold engraving energy, a recording plate F may not be engraved. In other words, if the energy is less than the threshold engraving energy, even if the recording plate F is irradiated with laser beam, the surface of the recording plate F is not engraved. The threshold engraving energy defers depending upon kinds (materials) of the recording plate F.

FIGS. 9A to 9E show a case where light power control when a pixel exposure amount signal of laser beam is OFF is carried out only on a portion corresponding to a convex fine line P of 21.2 μm width (light power control to which the invention is not applied). In this case, even if the pixel exposure amount signal of laser beam is OFF, a region of the convex fine line P is also exposed to light. Thus, as shown in FIG. 9E, the width of the upper surface P5 of the convex fine line P is the threshold engraving energy or less, and thus, the cross section shape of the convex fine line P become substantially trapezoidal shape. The width of the upper surface P5 of the convex fine line P is less than desired 21.2 μm.

FIGS. 10A to 10E show a case where light power control when a pixel exposure amount signal of laser beam is OFF is carried out also by the each pixel (total two pixels) of upstream and downstream of the convex fine line P of 21.2 μm width in the scanning direction. In this case, the convex fine line P portion is not completely exposed to light, the width of the upper surface P5 of the convex fine line P may be closer to 21.2 μm which is a desired value (21.2 μm width is secured or substantially secured). The width of the upper surface P5 of the convex fine line P is a portion of the threshold engraving energy or less and thus, the side is wider by α1 in the drawing to be precisely. A bottom side of the trapezoidal shape shown in FIG. 10E is about 20 μm.

In the case of FIGS. 10A to 10E, although the width of the upper surface P5 of the convex fine line P may be close to about desired 20 μm, the inclination angles of the sidewalls P1 and P2 upstream and downstream of the convex fine line P in the scanning direction are gentle. The angle of the edge portion E constituted by the upper surface P5 and the sidewalls P1 and P2 falls (more than 90°). However, in order to print a file line after printing precisely, it is necessary to erect the edge portion E (it is necessary to bring the angle close to 90°). That is, it is necessary to bring the inclination angles of the sidewalls P1 and P2 close to 90° (vertical).

Hence, in the printing plate making apparatus 11 of the exemplary embodiment, the invention is applied, the light power by outer one pixel in which laser beam is OFF is increased, thereby bringing the inclination angles of the sidewalls P1 and P2 close to 90° (vertical). That is, the edge portion E is erected (closer to 90°). With this, the cross section shape of the convex fine line P is brought closer to a rectangular shape.

Since the width of the upper surface P5 of the convex fine line P is a portion where the energy is the threshold engraving energy or less and thus, to be precise, the width is wider by α2 in the drawing, however since the inclination angles of the sidewalls P1 and P2 are brought closer to vertical, this is extremely slight and no problem occurs. The increasing width for increasing the light power of laser beam may be increased or width at which the pixel exposure amount signal is turned OFF may be slightly narrowed to narrow by α2 (to bring the width closer to desired 21.2 μm).

In the printing plate making apparatus 11 of this exemplary embodiment, the light power is turned OFF in one pixel upstream and downstream in the scanning direction in region adjacent to the convex fine line P, the light power of one pixel (vicinity region) in vicinity of outer side where the laser beam is turned OFF is increased, whereby bringing the inclination angles of the sidewalls P1 and P2 closer to vertical (edge portion E is erected (closer to 90°)).

Even if the beam diameter D is as large as 20 μm (even if beam diameter D is more than one pixel), if the light power control of the invention is applied, the width of the upper surface P5 of the convex fine line P may be brought closer to the desired width (21.2 μm in this exemplary embodiment), and the cross section shape of the convex fine line P may be brought closer to the rectangular shape. That is, the convex fine line P may precisely be engraved. Thus, the reproducibility of fine line in a printing medium printed by a recording plate F after the plate is made may be enhanced.

Figure 18A:
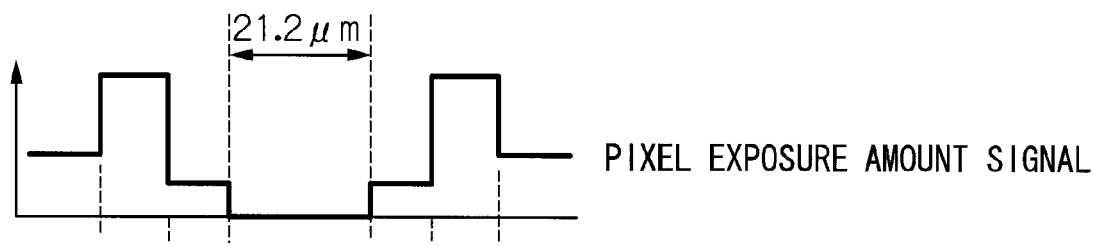
FIG. 18A shows light power control to which the invention is applied and a pixel exposure amount signal of laser beam when a beam diameter D is 20 μm.
Figure 18B:
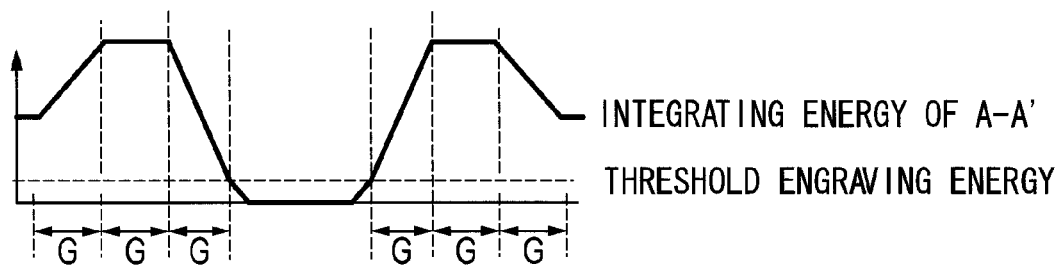
FIG. 18B is a graph showing integrating energy, of light power of laser beam, and FIG. 18C schematically shows a cross section shape of a convex fine line P.
Figure 18C:
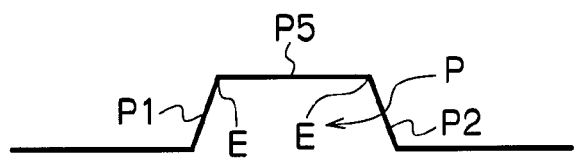

As shown in FIGS. 18A to 18C, the pixel exposure amount signal of the laser beam may not be turned OFF (light power is 0(zero)) by one pixel (total two pixels) upstream and downstream in the scanning direction of the convex fine line P having about 20 μm width, and the light power control may be performed such that exposure is carried out at threshold engraving energy or less.

Next, a case where the spot diameter D of laser beam is ϕ40 μm will be described using FIGS. 12A to 15C.

Figure 12A:
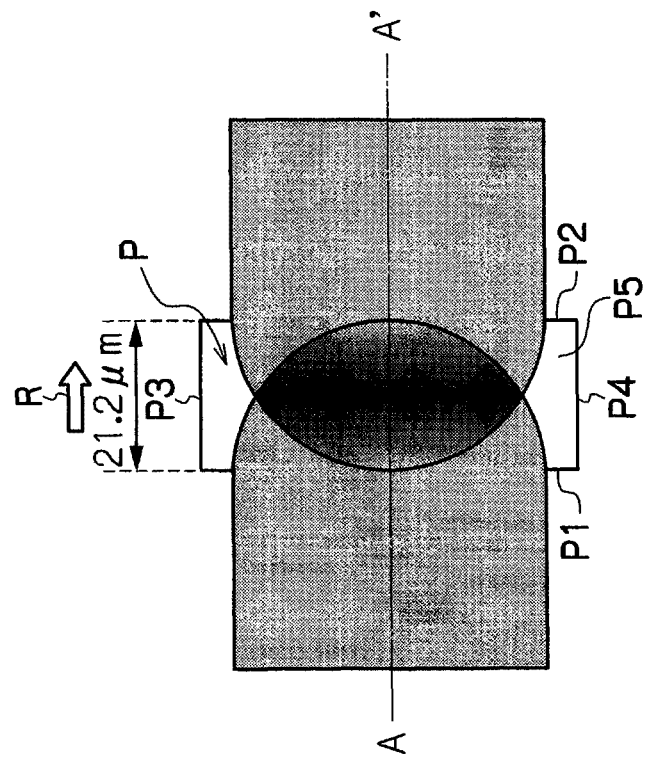
FIG. 12A shows light power control to which the invention is not applied and a spot diameter (spot shape) of laser beam when a beam diameter D is 40 μm, and a left drawing is a graph showing light power of center cross section.
Figure 12B:
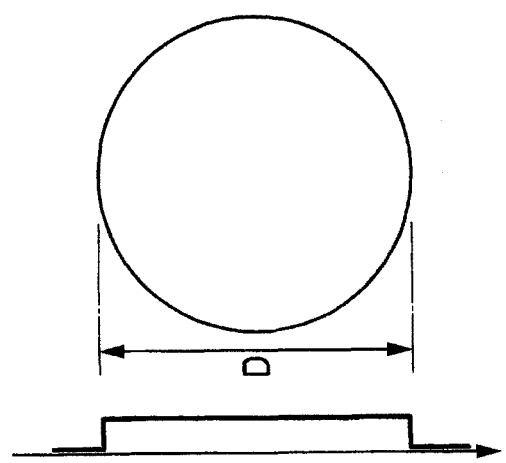
FIG. 12B is a schematic diagram showing light power variation when scanning is carried out by laser beam having the spot diameter (spot shape) shown in FIG. 12A to form a convex fine line of 21.2 μm.
Figure 13A:
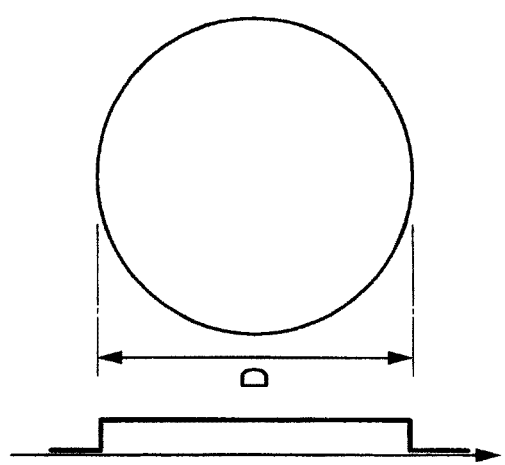
FIG. 13A shows light power control to which the invention is not applied and a spot diameter (spot shape) of laser beam when a beam diameter D is 40 μm, and is a graph showing light power distribution of center cross section.
Figure 13B:
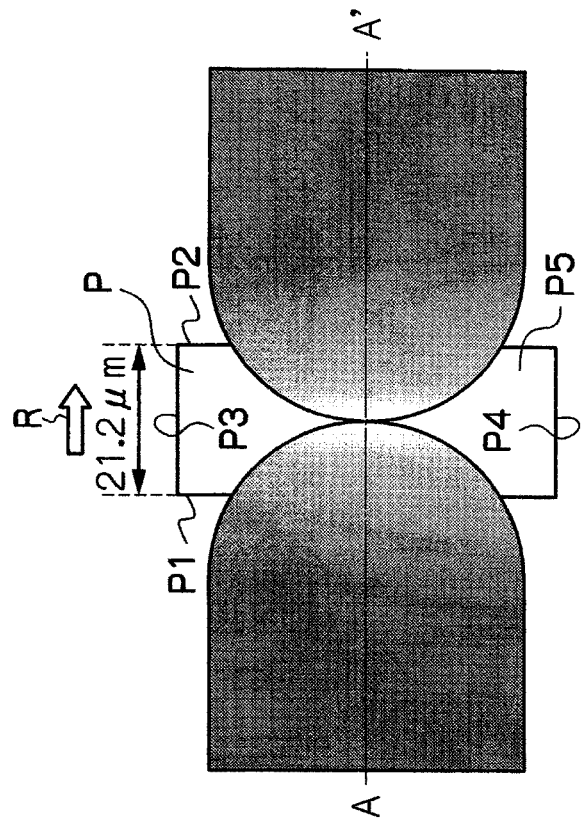
FIG. 13B is a schematic diagram showing light power variation when scanning is carried out by laser beam having the spot diameter (spot shape) shown in FIG. 13A to form a convex fine line of 21.2 μm.
Figure 13C:
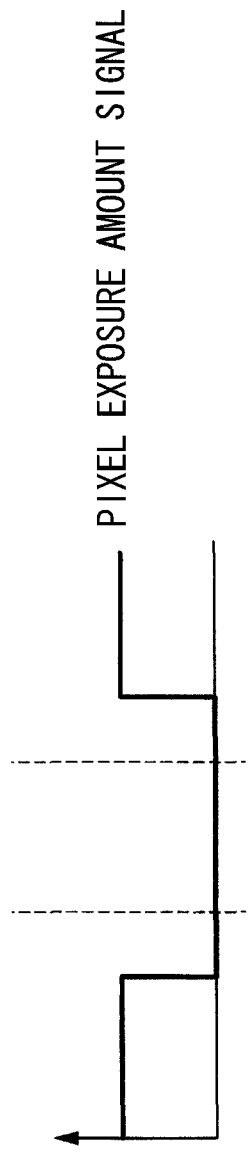
FIG. 13C shows a pixel exposure amount signal of laser beam.
Figure 13D:
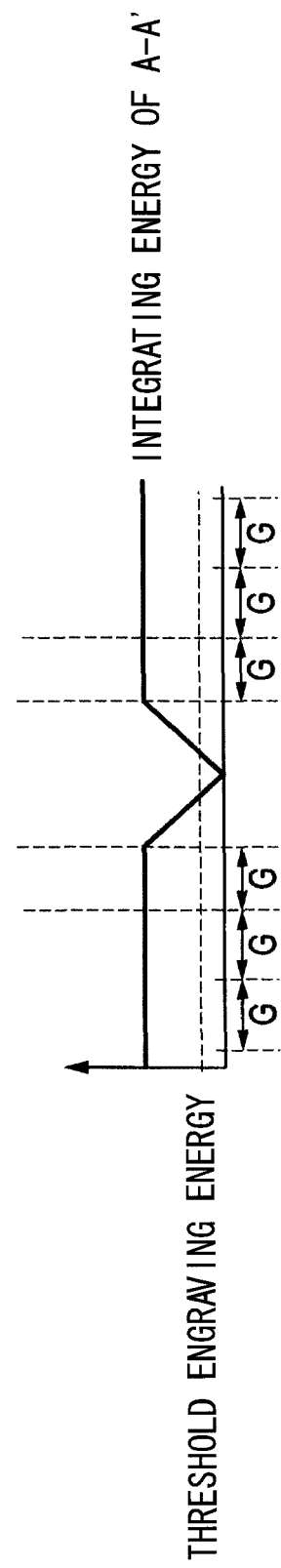
FIG. 13D is a graph showing integrating energy, of light power of laser beam of cross section taken along the A-A' line in FIG. 13B.

In FIGS. 12A to 13E, like the case where the spot diameter D is ϕ20 μm, right drawings of FIGS. 12A and 13A show spot diameters (spot shapes) of laser beams, and left drawings are graphs showing light power distributions of center cross sections. FIGS. 12B and 13B schematically show light power variation when scanning is carried out by laser beam of the spot diameter (spot shape) shown in FIGS. 12A and 13A to form convex fine lines P of 20 μm. As the color is denser, the light power is stronger, and as the color is lighter, the light power is weaker. FIGS. 12C and 13C shows pixel exposure amount signals of laser beams. FIG. 12D is a graph showing integrating energy, of light power of cross section taken along the A-A line in FIG. 12B. FIG. 12E schematically shows a cross section shape taken along the A-A line in FIG. 12B. In the drawings, G represents a width of one pixel (10.58 μm). FIGS. 14A to 14C, and 15A to 15C only show diagrams corresponding to FIGS. 12C to 12E and 13C to 13E. The direction of the arrow R in the drawing is the scanning direction of laser beam (horizontal scanning direction in this exemplary embodiment).

FIGS. 12A to 12E show a case where light power control in which an exposure signal of laser beam only in a portion corresponding to the convex fine line P of 21.2 μm width is turned OFF is carried out (light power control to which the invention is not applied). In this case, even if the pixel exposure amount signal of laser beam is turned OFF, the convex fine line P is also exposed to light. Further, since the spot diameter D is as large as φ40 μm, as shown in FIG. 12D, laser beams are overlapped on the convex fine line P and the integrating energy is increased. Therefore, the convex fine line P is not formed as shown in FIG. 12E.

Figure 13E:
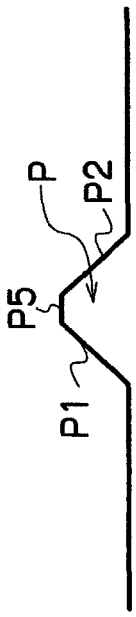
FIG. 13E is a schematic diagram showing a cross section shape of a convex fine line P taken along the line A-A in FIG. 13B.

FIGS. 13A to 13E show a case where light power control in which a pixel exposure amount signal of laser beam is turned OFF also in one pixel (total two pixels) upstream and downstream of the convex fine line P of 21.2 μm width in the scanning direction is carried out (light power control to which the invention is not applied). In this case also, since the spot diameter D is as large as φ40 μm, the convex fine line P is also exposed to light. Thus, as shown in FIG. 13E, the width of the upper surface P5 of the convex fine line P becomes a portion where the energy is the threshold engraving energy or less, the cross section shape becomes substantially trapezoidal shape. Thus, the width of the upper surface P5 of the convex fine line P is less than the desired 20 μm.

Figure 14A:
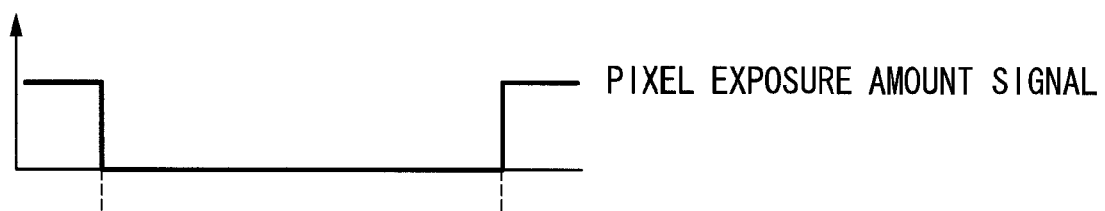
FIG. 14A shows light power control to which the invention is not applied and a pixel exposure amount signal of laser beam when a beam diameter D is 40 μm.
Figure 14B:
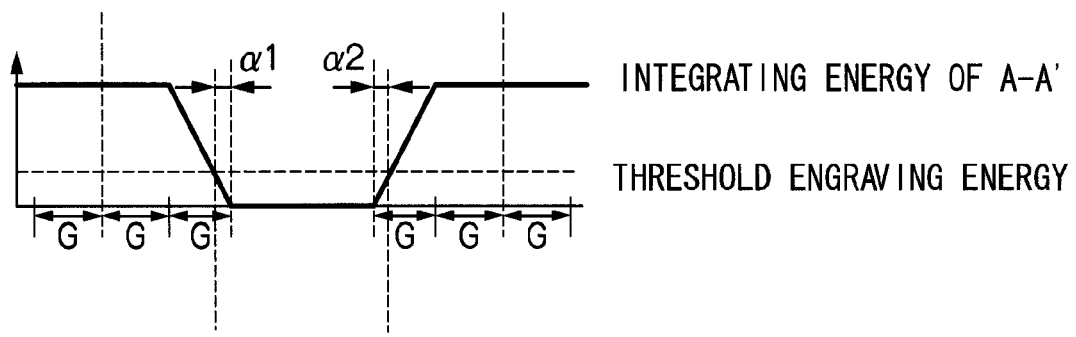
FIG. 14B is a graph showing integrating energy, of light power of laser beam, and FIG. 14C schematically shows a cross section shape of a convex fine line P.
Figure 14C:
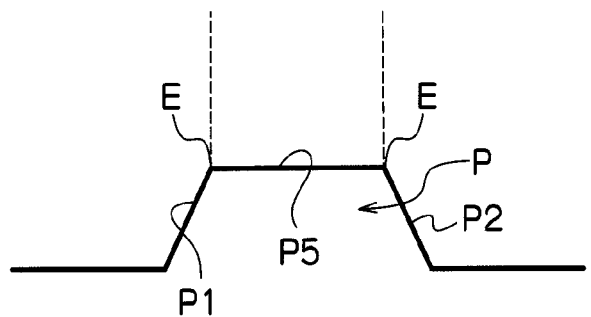
Figure 15A:
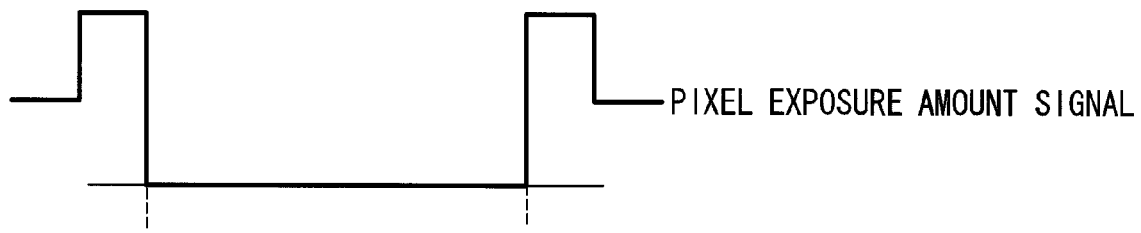
FIG. 15A shows light power control to which the invention is applied and a pixel exposure amount signal of laser beam when a beam diameter D is 40 μm.
Figure 15B:
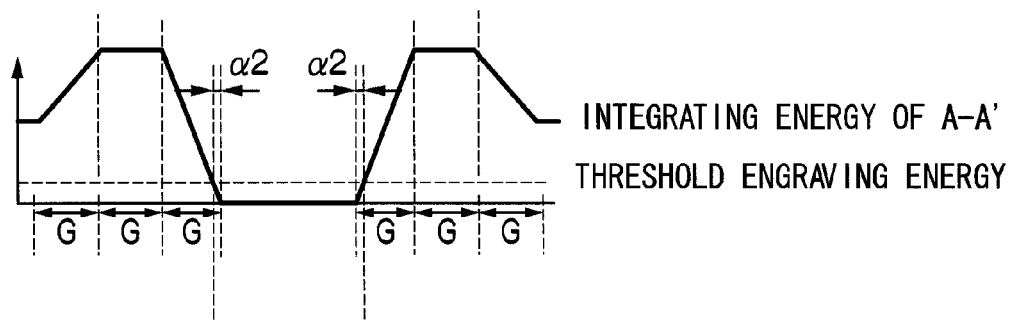
FIG. 15B is a graph showing integrating energy, of light power of laser beam, and FIG. 15C schematically shows a cross section shape of a convex fine line P.
Figure 15C:
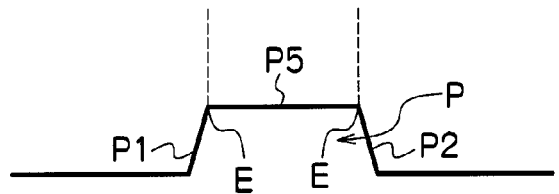

FIGS. 14A to 14C show a case where light power control in which a pixel exposure amount signal of laser beam of two pixels (total four pixels) upstream and downstream of the convex fine line P of 21.2 μm width is turned OFF is carried out (light power control to which the invention is not applied). In this case, since the portion of the convex fine line P is not substantially completely exposed to light, the width of the upper surface P5 of the convex fine line P may be closer to the desired value of 21.2 μm.

In this case, although the width of the upper surface P5 of the convex fine line P may be brought closer to the desired 21.2 μm, the inclination angles of the sidewalls P1 and P2 upstream and downstream of the convex fine line P are gentle as shown in FIG. 14C. That is, the angle of the edge portion E constituted by the upper surface P5 and the sidewalls P1 and P2 fall (the angle is more than 90°). To enhance the precision of fine line after printing, it is necessary to erect the edge portion E (it is necessary to bring the angle closer to 90°). That is, it is necessary to bring the inclination angles of the sidewalls P1 and P2 closer to vertical (90°).

Hence, like the case where the beam diameter D is 20 μm as described above, the invention is applied, as shown in FIGS. 15A to 15C, the light power of one pixel on the outer side where the laser beam is turned OFF is increased, the inclinations of the sidewalls P1 and P2 are brought closer to vertical ((closer to 90°) by more erecting the edge portion E), and the cross section shape of the convex fine line P may be brought closer to the rectangular shape.

Even if the beam diameter D is as large as 40 μm (even if the beam diameter D is more than one pixel and more than the width of the convex fine line P), if the invention is applied, the upper surface P5 of the convex fine line P may be brought closer to the desired 20 μm, and to bring the cross section shape of the convex fine line P close to the rectangular shape. That is, even if the beam diameter D is as large as 40 μm, the convex fine line P may be engraved precisely. Thus, the reproducibility of fine line on a printing medium printed by the recording plate F after the plate is made may be enhanced.

Figure 19A:
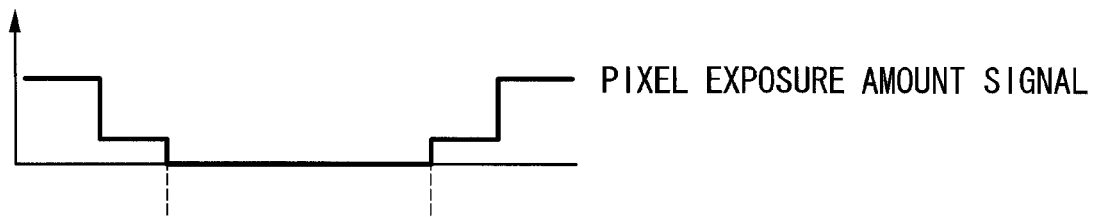
FIG. 19A shows light power control to which the invention is not applied and a pixel exposure amount signal of laser beam when a beam diameter D is 40 μm.
Figure 19B:
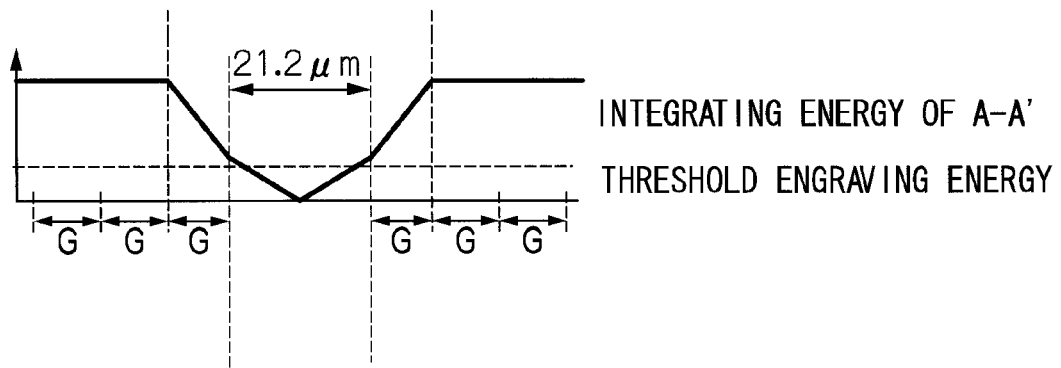
FIG. 19B is a graph showing integrating energy, of light power of laser beam, and FIG. 19C schematically shows a cross section shape of a convex fine line P.
Figure 19C:
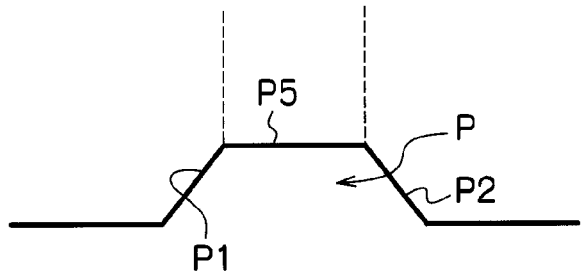

As shown in FIGS. 19A to 19C, the pixel exposure amount signal of laser beam in two pixels (total four pixels) upstream and downstream of the convex fine line P of about 20 μm width may be not turned OFF, and the light power control for exposing to threshold engraving energy or less may be carried out. In this case also, the power light amount of one pixel on the outer side where the laser beam is the threshold engraving energy or less is increased, the inclinations of the sidewalls P1 and P2 are brought closer to vertical ((closer to 90°) by more erecting the edge portion E), the cross section shape of the convex fine line P is brought closer to the rectangular shape.

The laser beam diameter D may be the same as or different from those of the laser beam LA and laser beam LB (see FIG. 8). For example, a beam diameter D of laser beam LA for shallow engraving may be 20 μm and a beam diameter D of laser beam LB for deep engraving may be 40 μm.

Next, light power control which is carried out in such a manner that when power light amount of one pixel on the outer side where laser beam is turned OFF (or the threshold engraving energy or less) is increased, the pulse exposure is carried out, thereby bringing the inclinations of the sidewalls P1 and P2 to the vertical ((closer to 90°) by more erecting the edge portion E). This light power control will be described. In other words, light power control for bringing the cross section shape of the convex fine line P closer to the rectangular shape will be described.

In this description, the beam diameter D is about 20 μm, but even if the beam diameter D is 40 μm, nothing is changed.

Figure 16A:
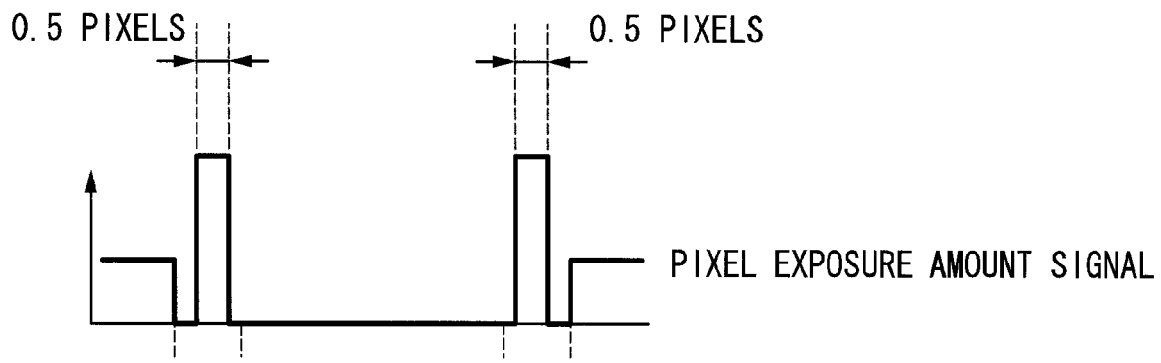
FIG. 16A shows light power control to which the invention is applied and a pixel exposure amount signal of laser beam when a beam diameter D is 20 μm.
Figure 16B:
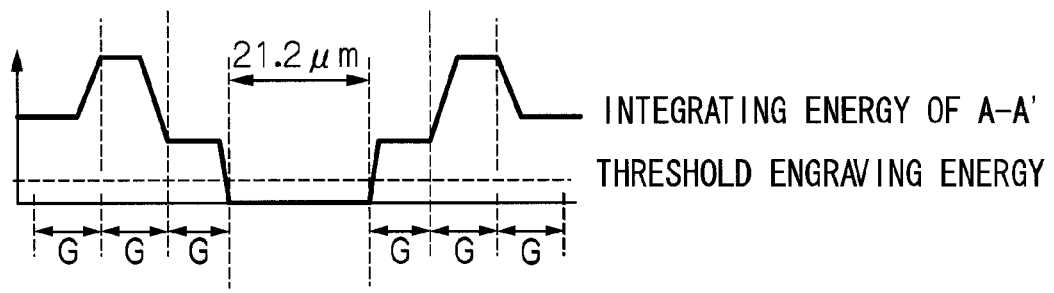
FIG. 16B is a graph showing integrating energy, of light power of laser beam, and FIG. 16C schematically shows a cross section shape of a convex fine line P.
Figure 16C:
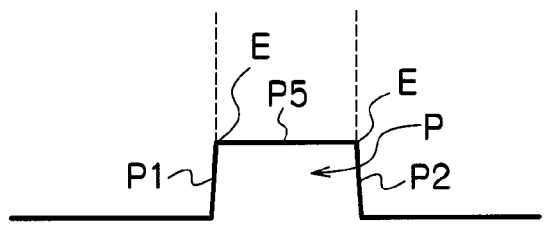

FIGS. 16A to 16C show a case where pulse exposure is carried out with pulse width of 0.5 pixels. As may be found from FIGS. 16A to 16C, the inclinations of the sidewalls P1 and P2 may be brought closer to vertical. At that time, it is preferable that the maximum value of light power is increased such that the integrating energy becomes substantially equal to that shown in FIGS. 11A to 11C.

Figure 17A:
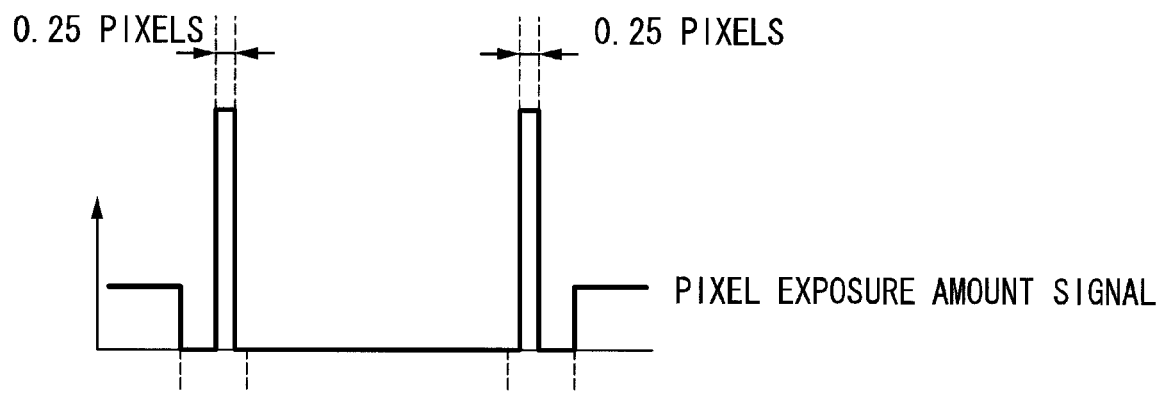
FIG. 17A shows light power control to which the invention is applied and a pixel exposure amount signal of laser beam when a beam diameter D is 20 μm.
Figure 17B:
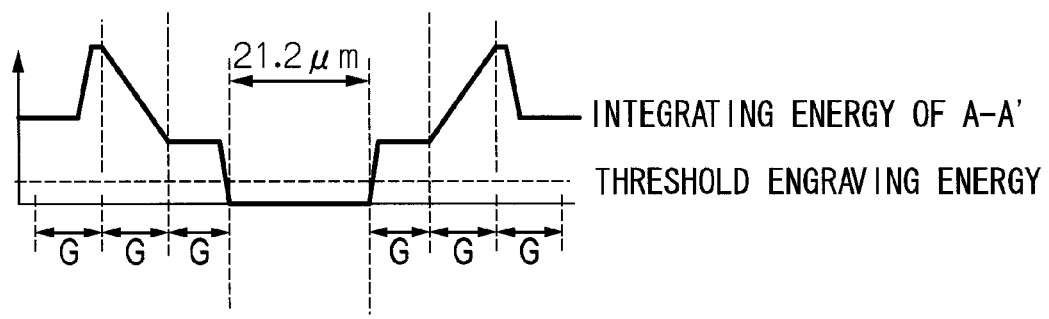
FIG. 17B is a graph showing integrating energy, of light power of laser beam, and FIG. 17C schematically shows a cross section shape of a convex fine line P.
Figure 17C:
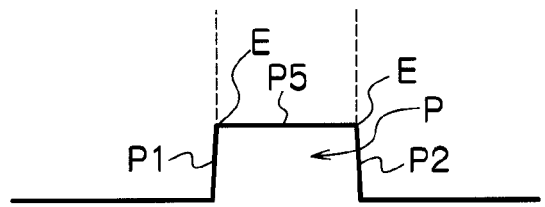

FIGS. 17A and 17C show a case where pulse exposure is carried out with pulse width of 0.25 pixels. As may be found in FIGS. 17A to 17C, if the pulse width is further narrowed, the inclinations of the sidewalls P1 and P2 may be brought closer to vertical. At that time, it is preferable further increase the maximum value of light power so that the integrating energy becomes substantially equal to that shown in FIGS. 11A to 11C (16A to 16C).

Next, other operation and effect of the exemplary embodiment will be described.

In this exemplary embodiment, the laser exposure system which emits laser beam is the fiber array exposure system which emits laser beam from the light source unit 20 (fiber array light source) and then focuses the laser beam by the imaging lens 34. This laser exposure system may be produced inexpensively as compared with a laser exposure system using fiber laser or CO2 laser light source.

For example, in the exemplary embodiment, the light power is controlled on both upstream and downstream in the horizontal scanning direction, however the light power may be controlled only one of upstream and downstream.

Further, the light power control of the invention may be applied to at least one of upstream and downstream in the vertical scanning direction instead of upstream and downstream in the horizontal scanning direction. That is, the width of the upper surface P5 in the cross section taken along the B-B' line shown in FIG. 9 may be brought closer to the desired 21.2 μm, and the cross section may be brought closer to the rectangular shape (sidewalls P3 and P4 are also brought close to vertical).

The threshold engraving energy is light energy, of light beam required for engraving a surface of a recording medium. If the energy is more than the threshold engraving energy, a recording medium may not be engraved. The threshold engraving energy is a technique not disclosed in the prior art, and if this is taken into consideration, the plate may be engraved more finely.

2. Exemplary Embodiment 2

A printing plate making apparatus of an exemplary embodiment 2 has the same structure as that of the exemplary embodiment 1 as a whole.

Figure 20:
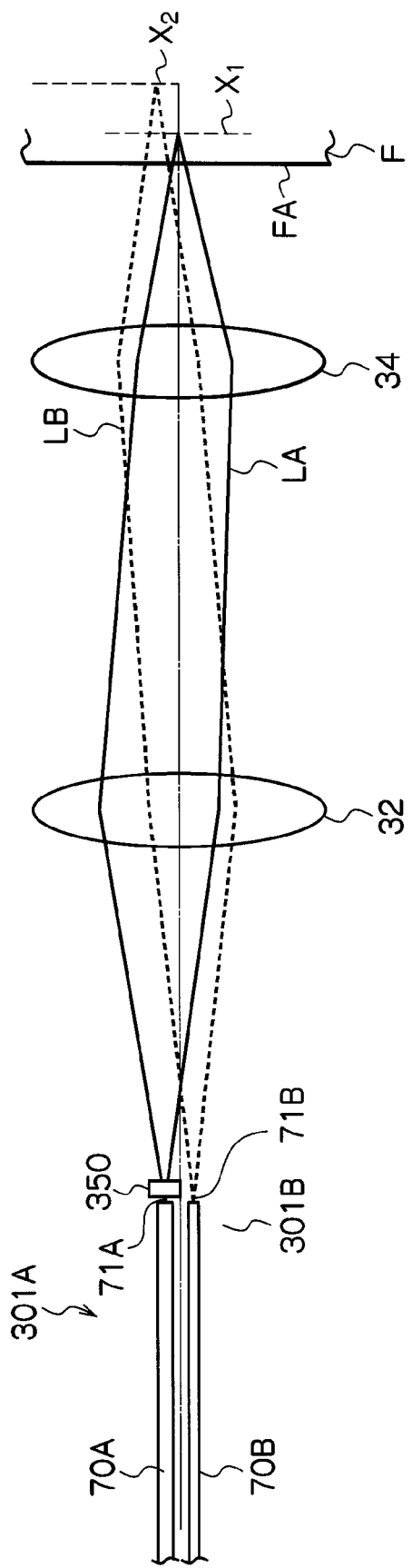
FIG. 20 is an explanatory diagram schematically showing an essential portion of an exposure head and emitted laser beam.

However, as shown in FIG. 20, an image of laser beam is formed near an exposure surface (surface) FA of the recording plate F constituted by a collimator lens 32 and an imaging lens 34 (the opening member 33 is not shown in FIG. 20), and a clear plate-like imaging position shift member 350 is disposed in front of an optical fiber end group 301A (optical fiber end 71A) as imaging position changing means. With this, an imaging position of laser beam LA emitted from the optical fiber end group 301A (optical fiber end 71A) is shifted toward the exposure surface FA. The imaging position of the laser beam LA is defined as a first imaging position X1, and the imaging position of the laser beam LB is defined as a second imaging position X2.

Next, control procedure of light power of laser beams LA and LB in step 108 will be described.

As shown in FIG. 4, if the optical fiber end group 301A and the optical fiber end group 301B are viewed in the horizontal scanning direction, a distance between the optical fiber ends 71A and 72B, i.e., a distance between scanning lines K (pixel pitch) is defined as 10.58 µm (resolution 2400 dpi). In other words, one pixel is defined as 10.58 µm.

The printing plate making apparatus 11 of the exemplary embodiment 2 shallowly engraves the recording plate F when engraving a narrow region (precise engraving of fine line or meshed point) and deeply engraves the recording plate F when engraving a wide region.

More specifically, when shallowly engraving, the output (power) of laser beam is reduced, an image is scanned by laser beam LA emitted from the optical fiber end 71A of mainly the optical fibers 70A (optical fiber end group 301A) to engrave a printing plate.

When deeply engraving, the output (power) of laser beam is increased, a printing plate is engraved to a first depth L1 by laser beam LA emitted from the optical fiber end 71A of the optical fibers 70A (optical fiber end group 301A) and then, the same scanning lines K (see FIG. 6) are engraved to a second depth L2 by laser beam LB emitted from the optical fiber ends 71B of the optical fiber 70B (optical fiber end group 301B). In this exemplary embodiment, the first depth L1 is 250 µm and the second depth L2 is 500 µm.

Figure 21:
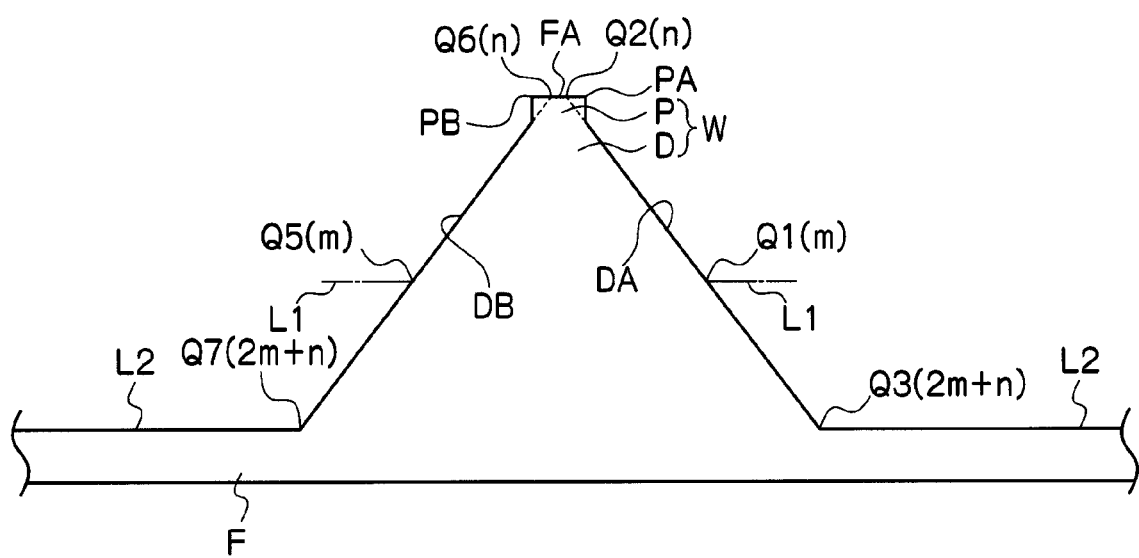
FIG. 21 schematically shows a cross section shape taken along a horizontal scanning direction of a region W to be left in a convex form.

At the time of this deep engraving, a case where a region (left in convex shape) is formed in the recording plate F as shown in FIG. 21 will be described. A cross section of the region W extending along the horizontal scanning direction has such a shape that a convex fine line P having a rectangular cross section is formed on an upper portion (on an upper bottom) of a foundation D having a substantially trapezoidal cross section. An upstream end PA located upstream of the convex fine line P in the scanning direction constituting an upper portion of the region W where the recording plate F is left in a convex shape is defined as an upstream reference position, and a downstream end PB located downstream in the scanning direction is defined as an upstream reference position. The convex fine line P has a vertical scanning direction in the longitudinal direction.

In this exemplary embodiment, the light power P1 of the laser beam LA and the light power P2 of the laser beam LB are the same. However, the invention is not limited to this (the light power P1 of the laser beam LA and the light power P2 of the laser beam LB may be different from each other).

Figure 22A:
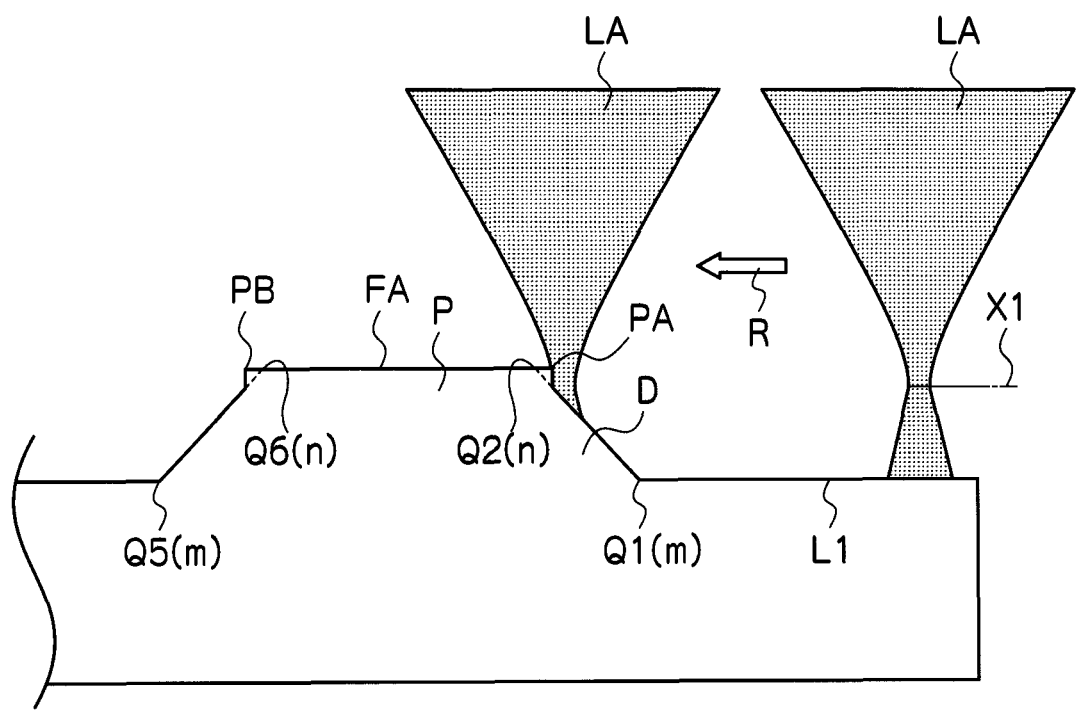
FIG. 22A is an explanatory diagram schematically showing engraving by laser beam LA.
Figure 22B:
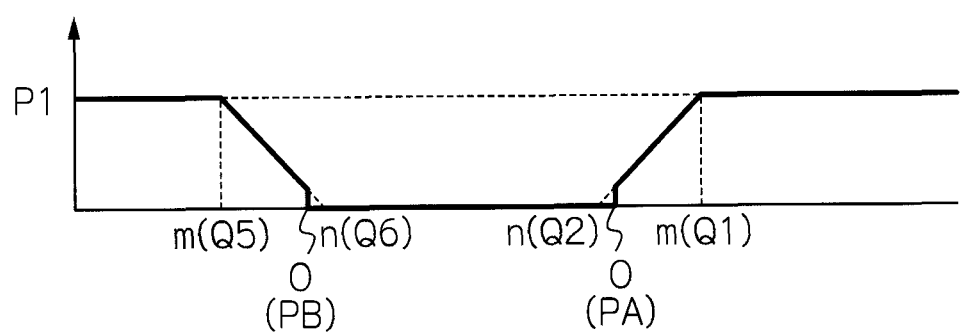
FIG. 22B is a graph showing light power control of the laser beam LA.
Figure 23A:
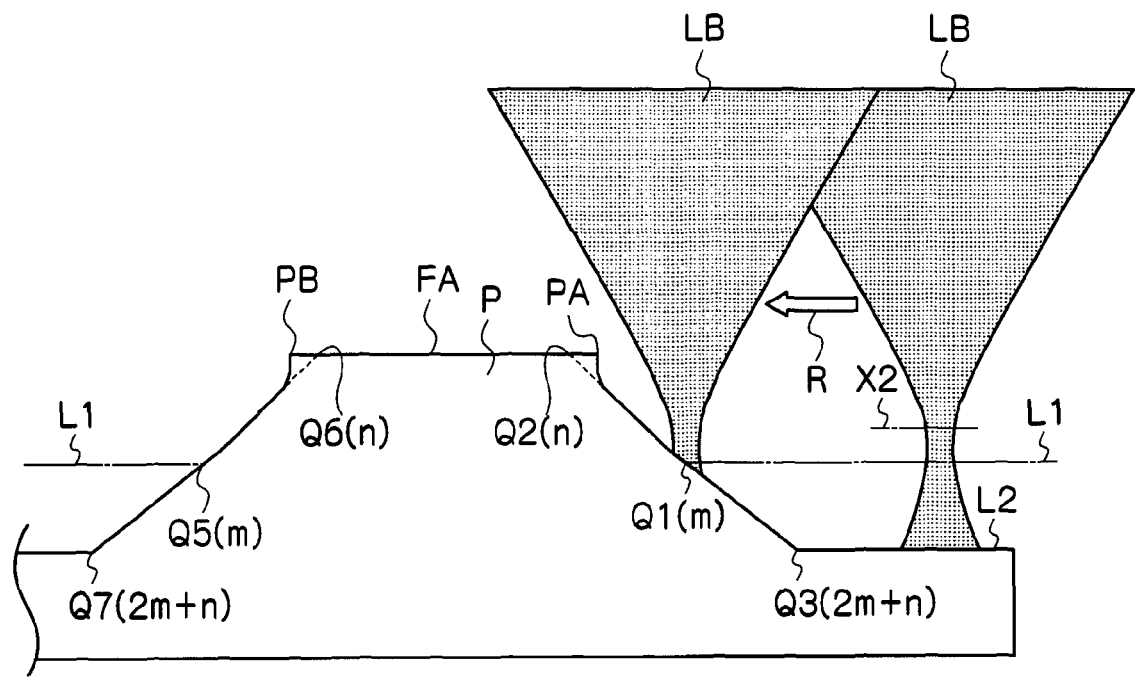
FIG. 23A is an explanatory diagram schematically showing engraving by laser beam LB.
Figure 23B:
FIG. 23B is a graph showing light power control of the laser beam LB.
Figure 24:
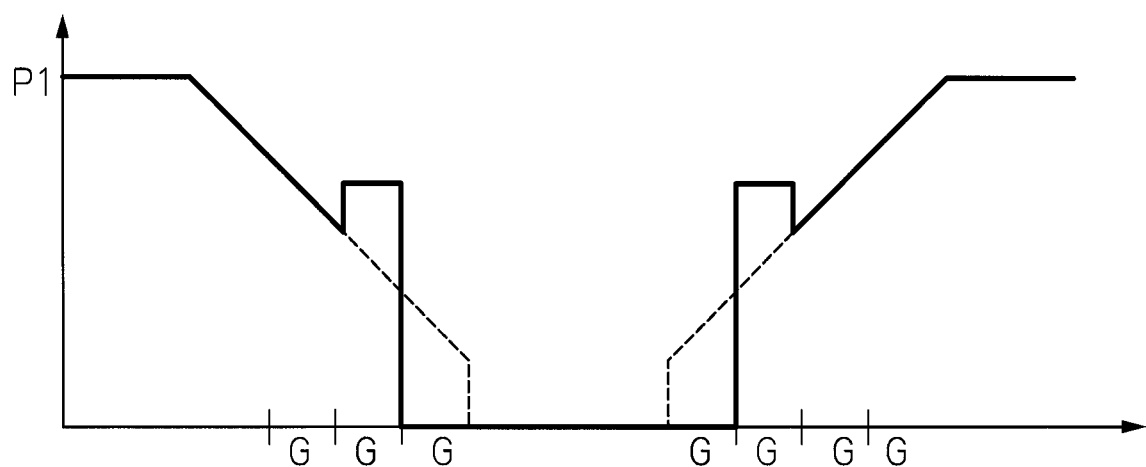
FIG. 24 is a graph showing light power control of the laser beam LA.

Here, the light power control for forming the region W shown in FIG. 21 will be described using FIGS. 22A to 23B. FIG. 22A is an explanatory diagram schematically showing engraving by laser beam LA, and FIG. 22B is a graph showing the light power control of laser beam LA. Similarly, FIG. 23A is an explanatory diagram schematically showing engraving by laser beam LB, and FIG. 23B is a graph showing the light power control of laser beam LB.

As shown in FIGS. 22A and 22B, the recording plate F is scanned by the laser beam LA in a predetermined pixel pitch (10.58 µm pitch in the exemplary embodiment) and engraved at the first depth L1. At that time, light power of laser beam LA is reduced from P1 linearly or substantially linearly from a first point Q1 or the vicinity thereof along a line segment connecting the first point Q1 in a first depth L1 separated from an upstream reference position (PA) by m pixels upstream in the scanning direction and a second point Q2 separated from the upstream reference position (PA) on a surface FA of the recording plate F by n pixels downstream in the scanning direction, and the energy is reduced to the threshold engraving energy or less at the upstream reference position (PA) or the vicinity thereof (PA) (in this exemplary embodiment, the exposure light is turned OFF (light power is set to 0)). That is, the light power of laser beam LA starts lowering from the first point Q1 or the vicinity thereof and the energy is set to threshold engraving energy or less at the upstream reference position (PA) or the vicinity thereof (PA).

The threshold engraving energy is energy, of laser beam required for engraving a surface of a recording plate F, and if the energy is more than the threshold engraving energy, the recording plate F may not be engraved. In other words, if the energy is less than the threshold engraving energy or less, even if the recording plate F is irradiated with laser beam, the surface of the recording plate F is not engraved. The threshold engraving energy defers depending upon kinds (materials) of the recording plate F.

A width of the convex fine line P in the scanning direction is scanned at threshold engraving energy or less (in this exemplary embodiment, the exposure is turned OFF) and then, light power of laser beam LA is set so as to be equal or higher than the threshold engraving energy, from the downstream reference position or the vicinity thereof (in this exemplary embodiment, the exposure is turned ON), the light power is increased to linearly or substantially linearly and this point is defined as a fifth point Q5 or near P. At that time, the light power is increased linearly or substantially linearly along a line segment connecting a fifth point Q5 in the first depth L1 separated from the downstream reference position (PB) by m pixels downstream in the scanning direction and a sixth point Q6 separated from the downstream reference position in the surface FA of the recording plate F by n pixels upstream in the scanning direction.

Next, as shown in FIGS. 23A and 23B, the recording plate F is scanned at a predetermined pixel by laser beam LB and the plate is engraved at the second depth L2. At that time, the light power of laser beam LB is reduced from P2 linearly or substantially linearly from a third point Q3 or the vicinity thereof along a line segment connecting the first point Q1 and a third point Q3 in the second depth L2 separated from the upstream reference position (PA) by (2m+n) pixels upstream in the scanning direction, and the energy is set to the threshold engraving energy or less at the first point Q1 or the vicinity thereof (in this exemplary embodiment, the exposure is turned OFF (light power is set to 0)). That is, light power of laser beam LB starts lowering from the third point Q3 or the vicinity thereof, and the energy is set to threshold engraving energy or less at the first point Q1 or the vicinity thereof.

The width of the convex fine line P in the scanning direction is scanned at the threshold engraving energy or less (in this exemplary embodiment, the exposure is turned OFF) and then, the light power of the laser beam LB is set so as to be equal or higher than the threshold engraving energy, from the fifth point Q5 or the vicinity thereof (in this exemplary embodiment, exposure is turned ON), the light power is increased linearly or substantially linearly, and the light power is set to P2 at a seventh point Q7 or the vicinity thereof. At that time, the light power is increased linearly or substantially linearly along a line segment connecting the fifth point Q5 and the seventh point Q7 separating from the downstream reference position (PB) in the second depth L2 downstream in the scanning direction by (2m+n) pixels.

By performing such light power control, even when the recording plate F is scanned twice and is engraved, the region W to be left in a convex shape may be brought close into such a shape that a convex fine line P having a substantially rectangular cross section is formed on top of a foundation D having a substantially trapezoidal cross section. An upstream inclined surface DA of the foundation D having a substantially trapezoidal cross section in the scanning direction becomes a substantially straight line. Similarly, a downstream inclined surface DB of the foundation D having a substantially trapezoidal cross section in the scanning direction becomes a substantially straight line. In other words, an inclined surface of a foundation engraved by the laser beam LB is substantially straightly connected to an inclined surface of a foundation engraved by the laser beam LA.

When the printing is carried out using a recording plate F (printing plate) after the plate is made, a case where a printing density is varied depending upon a pressing force against a printing medium, and a case where a fine line or highlight point is not printed clearly are prevented or suppressed, and clear printing may be carried out.

In this exemplary embodiment, since P1=P2, the first point Q1 and the seventh point Q7 are separated from the upstream reference position (PA) or the downstream reference position (PB) by (2m+n) pixels. However, when P1 and P2 are different from each other, the first point Q1 and the seventh point Q7 may be located at positions separated from the upstream reference position or downstream reference position by (2m+n)×(P2/P1) pixel.

Next, "n" and "m" will be described.

It is preferable that n is an integer from 1 to 3. That is, if n is an integer from 1 to 3, the convex fine line P having the substantially rectangular cross section is set to appropriate height.

It is preferable that m is an integer from 5 to 30. That is if m is the integer from 5 to 30, the foundation D having a substantially trapezoidal cross section is set to appropriate width.

The "convex fine line P has appropriate height" and the "foundation D having a substantially trapezoidal cross section has appropriate width" mean that when printing is carried out using a recording plate F (printing plate) after the plate is made, the "height" and "width" are set to such values that a case where a printing density is varied depending upon a pressing force against a printing medium, and a case where a fine line or highlight point is not printed clearly are prevented or suppressed, and clear printing may be carried out.

Next, control of light power of laser beam LA for bringing a width of the convex fine line P in the scanning direction close to a predetermined width, and bringing a rectangular cross section to a rectangular shape will be described using FIG. 12. In the drawings, G represents one pixel (10.58 μm).

Even if a pixel exposure amount signal of laser beam LA is turned OFF, an upper surface of the convex fine line P is exposed to light. Thus, the width of the upper surface of the convex fine line P does not reach a desired width in some cases.

Hence, light power control in which a pixel exposure amount signal of laser beam LA is turned OFF is carried out also for one pixel of the convex fine line P upstream in the scanning direction. The engraving is carried out while increasing the light power than a line segment connecting the first point Q1 and the second point Q2 by one pixel on the outer side upstream in the scanning direction in which laser beam LA is turned OFF.

Similarly, light power control in which the pixel exposure amount signal of laser beam LA is turned OFF is carried out also for one pixel of the convex fine line P downstream in the scanning direction. The engraving is carried out while increasing the light power than a line segment connecting the fifth point Q5 and the sixth point Q6 by one pixel on the outer side downstream in the scanning direction in which laser beam LA is turned OFF.

By performing such light power control, the width of the upper surface P5 of the convex fine line P may be brought closer to the desired width and the edge portion (PA, PB) further erect (brought closer to 90°). That is, the cross section shape of the convex fine line P becomes closer to the rectangular shape (the convex fine line P is precisely engraved). Thus, reproducibility of fine line on a printing medium printed by a recording plate F after the plate is made is enhanced.

Although the scanning is carried out using laser beam LA and then the scanning is carried out using laser beam LB in this control method, the invention is not limited to this. Even when the scanning is carried out using laser beam LB and then the scanning is carried out using laser beam LA, if the same power control is performed, the shape of the region W to be left in a convex shape may be brought close into such a shape that a convex fine line P having a substantially rectangular cross section is formed on top of a foundation D having a substantially trapezoidal cross section.

Next, the fact that the same engraved shape may be obtained irrespective of which one of laser beam LA and laser beam LB is scanned first, i.e., the fact that the shape of the region W to be left in a convex shape may be brought close into such a shape that a convex fine line P having a substantially rectangular cross section is formed on top of a foundation D having a substantially trapezoidal cross section irrespective of which one of laser beam LA and laser beam LB is scanned first will be described.

Figure 25A:
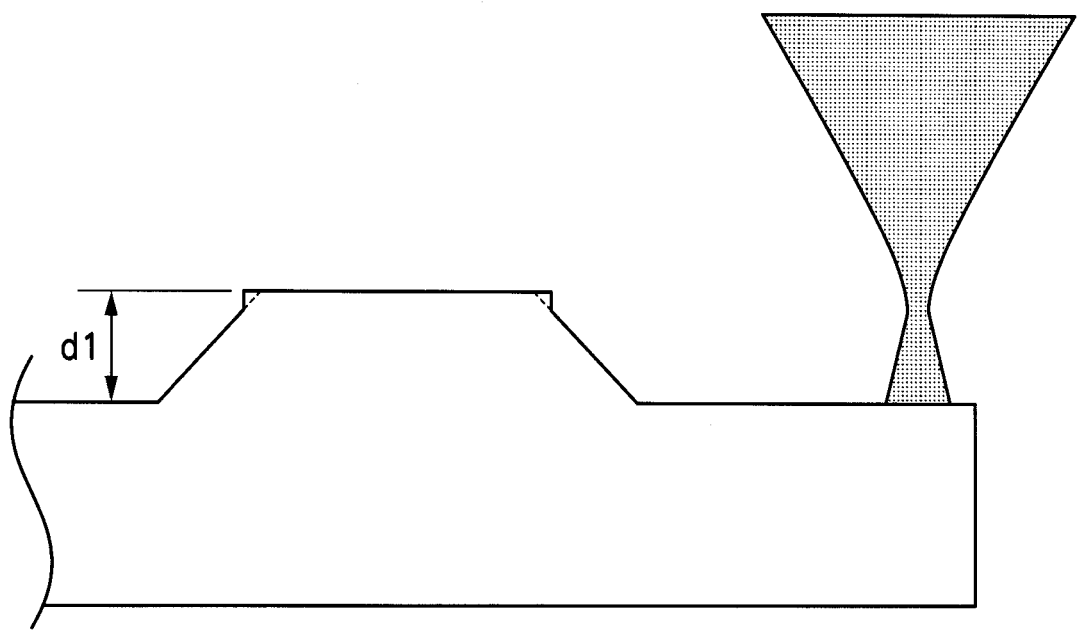
FIG. 25A is an explanatory diagram schematically showing engraving by laser beam LA.
Figure 26A:
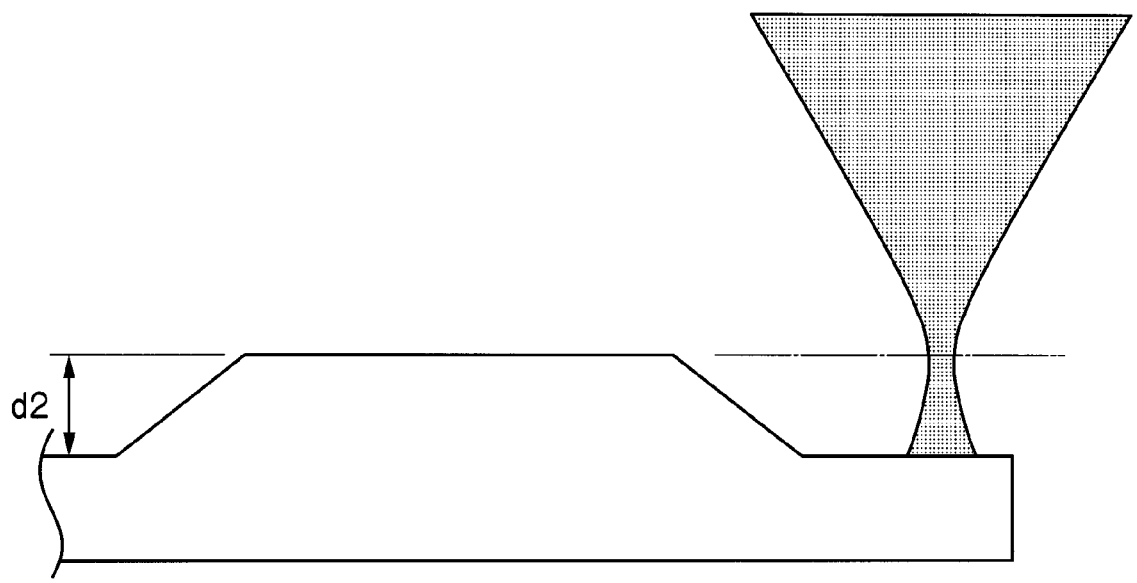
FIG. 26A is an explanatory diagram schematically showing engraving by laser beam LB.

A depth which may be engraved by laser beam LA is defined as d1 as shown in FIG. 25A, and a depth which may be engraved by laser beam LB is defined as d2 as shown in FIG. 26A. Here, the depth of d1+d2 is equal to the second depth L2.

Figure 25B:
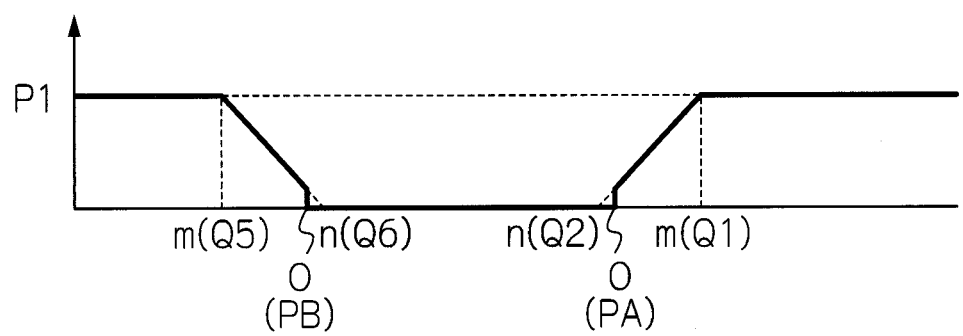
FIG. 25B is a graph showing light power control of the laser beam LA.

As shown in FIG. 25B, when scanning operation is carried out using laser beam LA to engrave, the light power of the laser beam LA is reduced from P1 linearly or substantially linearly from a first point or the vicinity thereof along a line segment connecting the first point separated from the upstream reference position upstream in the scanning direction by m pixels and a second point separated from the upstream reference position on the surface FA of the recording plate F downstream in the scanning direction, and the energy is set to the threshold engraving energy or less at the upstream reference position or the vicinity thereof. That is, the light power of laser beam LA starts lowering from the first point or the vicinity thereof, and the energy is set to the threshold engraving energy or less at the upstream reference position or the vicinity thereof.

The scanning is carried out while the width of the convex fine line P in the scanning direction is set to the threshold engraving energy or less and then, the light power of the laser beam LA is increased linearly or substantially linearly to the threshold engraving energy or higher from the downstream reference position or the vicinity thereof, and the point is set to P1 at the fifth point or the vicinity thereof. At that time, the light power is increased linearly or substantially linearly along a line segment connecting the fifth point separated away from the downstream reference position downstream in the scanning direction by m pixels and the sixth point separated away from the downstream reference position in the surface FA of the recording plate F upstream in the scanning direction by n pixels.

Figure 26B:
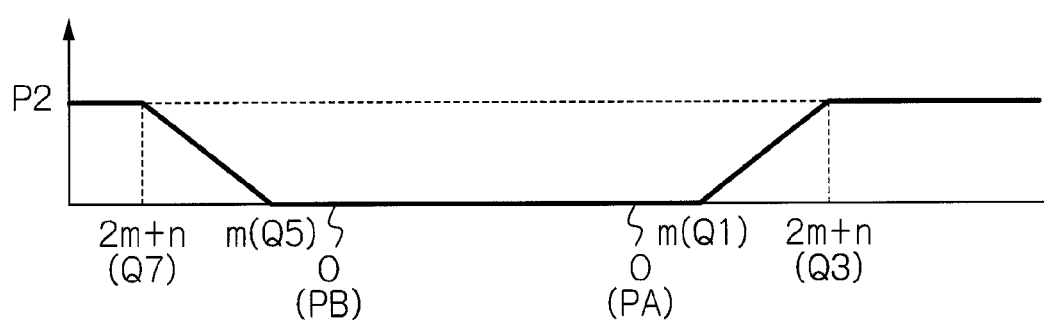
FIG. 26B is a graph showing light power control of the laser beam LB.

As shown in FIG. 26B, when scanning is carried out by laser beam LB and engraving the plate, the light power of the laser beam LB is reduced from P2 linearly or substantially linearly from the third point or the vicinity thereof along a line segment connecting the third point separated away from the upstream reference position upstream in the scanning direction in (2n+m) pixels and the first point, and the energy is set to the threshold engraving energy or less at the first point or the vicinity thereof. That is, the light power of the laser beam LB starts lowering at the third point or the vicinity thereof, and the energy, becomes the threshold engraving energy or lower at the first point or the vicinity thereof.

The width of the convex fine line P in the scanning direction is set to the threshold engraving energy or less and the scanning is carried out and then, the light power of the laser beam LB is increased to the threshold engraving energy or higher from the fifth point or the vicinity thereof, the light power is increased linearly or substantially linearly, and the point is set to P2 at the seventh point or the vicinity thereof. The light power is increased linearly or substantially linearly along a line segment connecting the fifth point and the seventh point separated away from the downstream reference position downstream in the scanning direction by (2m+n) pixels.

Figure 27A:
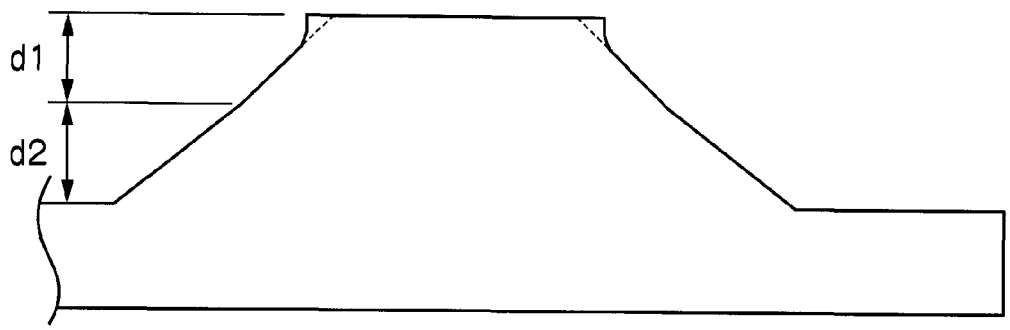
FIG. 27A schematically showing a cross section shape taken along a horizontal scanning direction of a region W to be left in a convex form.
Figure 27B:
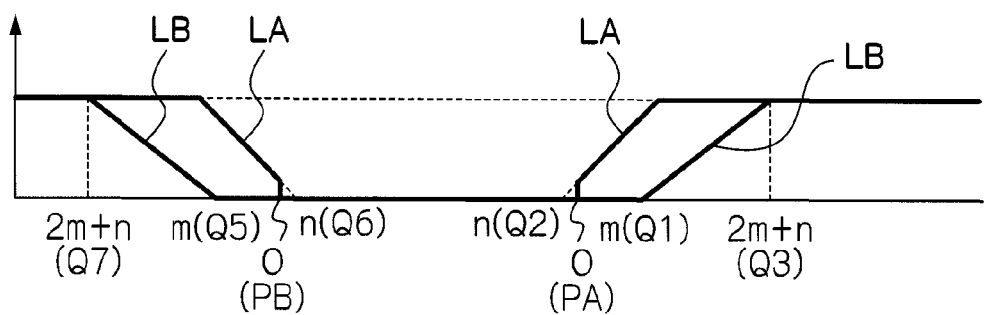
FIG. 27B is a graph showing light power control of laser beam LA and laser beam LB.
Figure 27C:
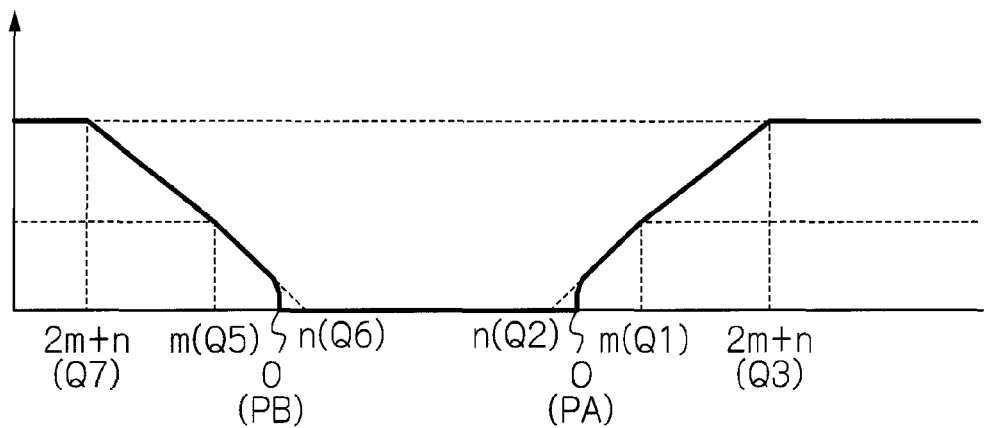
FIG. 27C is a graph showing total energy, of the laser beam LA and laser beam LB.

Here, if the scanning is carried out by the laser beam LB after the scanning is carried out by the laser beam LA, the light power control is the same as that described heretofore. Even when the scanning is carried out by the laser beam LA after the scanning is carried out by the laser beam LB, as shown in FIG. 27C, since the total exposure energy, of the laser beam LA and the laser beam LB is the same, substantially the same engraved shape may be obtained. That is, irrespective of which one of the laser beam LA and laser beam LB is scanned and exposed first, since the total exposure energy is the same, the shape of the region W to be left in a convex shape may be brought close into such a shape that a convex fine line P having a substantially rectangular cross section is formed on top of a foundation D having a substantially trapezoidal cross section. FIG. 27A schematically shows the cross section shape extending along the horizontal scanning direction of the region W to be left to the convex shape. FIG. 27B is a graph showing both FIGS. 25B and 26B. FIG. 27C is a graph showing the total energy, of the laser beam LA and the laser beam LB.

In the above description, since P1=P2, the first point and the seventh point are separated from the upstream reference position or the downstream reference position by (2m+n) pixels. However, when P1 and P2 are different from each other, the first point Q1 or the seventh point Q7 may be located at a position separated from the upstream reference position or downstream reference position by (2m+n)×(P2/P1) pixels.

As described above, the threshold engraving energy is light energy, of light beam required to engrave a surface of a recording medium, and if the energy is smaller than the threshold engraving energy, a recording medium may not be engraved. The threshold engraving energy is a technique that is not disclosed in the prior art, and if this energy is taken into consideration, the plate may be engraved more finely.

The invention is not limited to the exemplary embodiment.

Although the light power is controlled upstream and downstream in the horizontal scanning direction in the exemplary embodiment, the light power may be controlled only one of upstream and downstream.

The light power control of the invention may be applied to at least one of upstream and downstream in the vertical scanning direction instead of upstream and downstream in the scanning direction (horizontal scanning direction).

What is claimed is:

1. A printing plate making apparatus configured to scan a recording medium by a light beam at a predetermined pixel pitch, thereby engraving a surface of the recording medium to make a printing plate, wherein:

the light beam includes a first light beam and a second light beam, a light power of the first light beam is P1, a light power of the second light beam is P2, and depths engraved by the respective light powers are d1 and d2;

the printing plate making apparatus is configured such that, after scanning the recording medium with one of the first and second light beams at a predetermined pixel pitch to engrave the recording medium to a first depth d1 or d2, a scanning line scanned by the one light beam is scanned by the other of the first and second light beams and the recording medium is engraved to a second depth d1+d2 which is deeper than the first depth;

an upstream end of a convex portion forming an upper portion of a region where the recording medium is to be left in a convex shape is defined as an upstream reference position;

the printing plate making apparatus is configured to control light power of the first light beam such that, when the recording medium is scanned at a predetermined pixel pitch with the first light beam, from a first point which is separated from the upstream reference position by m pixels in the scanning direction, or the vicinity thereof, to a second point on the surface of the recording medium separated from the upstream reference position by n pixels downstream in the scanning direction, a light power of the first light beam is reduced linearly or substantially linearly from P1 such that at the upstream reference position or the vicinity thereof the light power of the first light beam is equal to or less than a threshold engraving energy; and when the recording medium is scanned by the second light beam at a predetermined pixel pitch, from a third point or the vicinity thereof, the third point being separated from the upstream reference position by (2m+n)×(P2/P1) pixels in the scanning direction, the printing plate making apparatus is configured to reduce the light power of the second light beam linearly or substantially linearly from P2 such that it becomes the threshold engraving energy or less at the first point or the vicinity thereof.

2. The printing plate making apparatus according to claim 1, wherein:

when engraving all or part of an adjacent region which is adjacent upstream in the scanning direction to a convex portion forming an upper portion of a region where a surface of the recording medium is to be left in a convex shape, the printing plate making apparatus is configured to reduce a light power of the first light beam so as to be equal to or less than the threshold engraving energy, at the upper surface of the convex portion, and in a vicinity region which is in the vicinity of an outer side of an upstream side of the adjacent region in the scanning direction, the printing plate making apparatus is configured to set the light power of the first light beam higher than the light power of the first light beam when engraving along a line segment connecting the first point and the second point.

3. The printing plate making apparatus according to claim 2, wherein n is an integer from 1 to 3.

4. The printing plate making apparatus according to claim 2, wherein m is an integer from 5 to 30.

5. The printing plate making apparatus according to claim 1, wherein n is an integer from 1 to 3.

6. The printing plate making apparatus of claim 5, further configured to:
scan the recording medium by a light beam in a horizontal scanning direction and a vertical scanning direction that is perpendicular to the horizontal direction, and
control light power of the light beam when the recording medium is scanned at one or both of the horizontal scanning direction and vertical scanning direction.

7. The printing plate making apparatus according to claim 1, wherein m is an integer from 5 to 30.

8. The printing plate making apparatus of claim 7, further configured to:
scan the recording medium by a light beam in a horizontal scanning direction and a vertical scanning direction that is perpendicular to the horizontal direction, and
control light power of the light beam when the recording medium is scanned at one or both of the horizontal scanning direction and vertical scanning direction.

9. The printing plate making apparatus of claim 1, further configured to:
scan the recording medium by a light beam in a horizontal scanning direction and a vertical scanning direction that is perpendicular to the horizontal direction, and
control light power of the light beam when the recording medium is scanned at one or both of the horizontal scanning direction and vertical scanning direction.

10. A printing plate making apparatus configured to scan a recording medium by a light beam at a predetermined pixel pitch, thereby engraving a surface of the recording medium to make a printing plate, wherein:
the light beam includes a first light beam and a second light beam, a light power of the first light beam is P1, a light power of the second light beam is P2, and depths engraved by the respective light powers are d1 and d2;
the printing plate making apparatus is configured such that, after scanning the recording medium with one of the first and second light beams at a predetermined pixel pitch to engrave the recording medium to a first depth d1 or d2, a scanning line scanned by the one light beam is scanned by the other of the first and second light beams and the recording medium is engraved to a second depth d1+d2 which is deeper than the first depth;
a downstream end of a convex portion forming an upper portion of a region where the recording medium is to be left in a convex shape downstream in the scanning direction is defined as a downstream reference position;
the printing plate making apparatus is configured to control light power of the light beam such that, when the recording medium is scanned at a predetermined pixel pitch with the first light beam, the light power of the first light beam is set to be equal to or greater than the threshold engraving energy at the downstream reference position or the vicinity thereof;
from a fifth point separated from the downstream reference position downstream in the scanning direction by m pixels to a sixth point on a surface of the recording medium separated from the downstream reference position in the scanning direction by n pixels, the printing plate making apparatus is configured to increase light power of the first light beam linearly or substantially linearly, and set the power of the first light beam to P1 at the fifth point or the vicinity thereof; and
the printing plate making apparatus is configured to control light power of the second light beam such that, when the recording medium is scanned at a predetermined pixel pitch by the second light beam, a light power of the second light beam is equal to or greater than the threshold engraving energy at the fifth point or the vicinity thereof, and towards a seventh point separated from the fifth point and the downstream reference position downstream in the scanning direction by (2m+n)×(P2/P1) pixels, the light power is increased linearly or substantially linearly and set to P2 at the seventh point or the vicinity thereof.

11. The printing plate making apparatus of claim 10, further configured to control light power of the first light beam such that:
a light power of the first light beam, which engraves all or part of an adjacent region which is adjacent to a convex portion downstream in the scanning direction which forms an upper portion of a region where a surface of the recording medium is to be left in a convex shape, is reduced to be equal to or less than the value of the threshold engraving energy at the upper surface of the convex portion, and
at the vicinity region which is in the vicinity of an outer side of an upstream side of the adjacent region in the scanning direction, the light power of the first light beam is set higher than the light power of the first light beam when engraving along a line segment connecting the fifth point and the sixth point.

12. The printing plate making apparatus according to claim 11, wherein n is an integer from 1 to 3.

13. The printing plate making apparatus according to claim 11, wherein m is an integer from 5 to 30.

14. The printing plate making apparatus according to claim 10, wherein n is an integer from 1 to 3.

15. The printing plate making apparatus according to claim 10, wherein m is an integer from 5 to 30.

16. A printing plate making method for engraving a surface of a recording medium to make a printing plate, the method comprising scanning a recording medium with a light beam at a predetermined pixel pitch, wherein
a light beam includes a first light beam and a second light beam, a light power of the first light beam is P1, a light power of the second light beam is P2, and depths engraved by the respective light powers are d1 and d2;
after the recording medium is scanned by one of the first and second light beams at a predetermined pixel pitch to the first depth d1 or d2, a scanning line scanned by the one light beam is scanned by the other of the first and second light beams, and the recording medium is engraved to a second depth d1+d2 which is deeper than the first depth;
an upstream end of a convex portion forming an upper portion of a region where the recording medium is to be left in a convex shape upstream in the scanning direction is defined as an upstream reference position;
light power control of the first light beam is carried out such that, when the recording medium is scanned at a predetermined pixel pitch with the first light beam, from a first point which is separated from the upstream reference position by m pixels in the scanning direction, or the vicinity thereof, to a second point on the surface of the recording medium separated from the upstream reference position by n pixels downstream in the scanning direction, a light power of the first light beam is reduced linearly or substantially linearly from P1 so that at the upstream reference position or the vicinity thereof the light power of the first light beam is equal to or less than a threshold engraving energy; and when the recording medium is scanned by the second light beam at a predetermined pixel pitch, from a third point or the vicinity thereof, the third point being separated from the upstream reference position by (2m+n)×(P2/P1) pixels in the scanning direction, the light power of the second light beam is reduced linearly or substantially linearly from P2 such that it becomes the threshold engraving energy or less at the first point or the vicinity thereof.

17. The printing plate making apparatus according to claim 16, wherein when engraving all or part of an adjacent region which is adjacent upstream in the scanning direction to a convex portion forming an upper portion of a region where a surface of the recording medium is to be left in a convex shape, a light power of the first light beam is reduced so as to be equal to or less than the threshold engraving energy, at the upper surface of the convex portion, and in a vicinity region which is in the vicinity of an outer side of an upstream side of the adjacent region in the scanning direction, the light power of the first light beam is set higher than the light power of the first light beam when engraving along a line segment connecting the first point and the second point.

18. A printing plate making method for engraving a surface of a recording medium to make a printing plate, the method comprising scanning a recording medium with a light beam at a predetermined pixel pitch, wherein a light beam includes a first light beam and a second light beam, a light power of the first light beam is P1, a light power of the second light beam is P2, and depths engraved by the respective light powers are d1 and d2;

after the recording medium is scanned by one of the first and second light beams at a predetermined pixel pitch to engrave to the first depth d1 or d2, a scanning line scanned by the one light beam is scanned by the other of the first and second light beams, and the recording medium is engraved to a second depth d1+d2 which is deeper than the first depth;

an upstream end of a convex portion forming an upper portion of a region where the recording medium is to be left in a convex shape upstream in the scanning direction is defined as an upstream reference position;

when the recording medium is scanned at a predetermined pixel pitch by the first light beam, a light power of the first light beam is set to a threshold engraving energy or higher from the downstream reference position or the vicinity thereof, toward a fifth point separated from the downstream reference position downstream in the scanning direction by m pixels and toward a sixth point on a surface of the recording medium separated by n pixels from the downstream reference position in the scanning direction, the light power is increased linearly or substantially linearly so that the light power is P1 at the fifth point or the vicinity thereof, when the recording medium is scanned by the second light beam in a predetermined pixel pitch, a light power of the second light beam is set to the threshold engraving energy or higher from the fifth point or the vicinity thereof, and then, the light power is increased linearly or substantially linearly along a line segment connecting the fifth point and a seventh point separated away from the downstream reference position downstream in the scanning direction by (2m+n)×(P2/P1) pixels, and the light power of the second light beam is set to P2 at the seventh point or the vicinity thereof.

19. The printing plate making method of claim 18, wherein when engraving all or part of an adjacent region which is adjacent to a convex portion downstream in the scanning direction forming an upper portion of a region where a surface of the recording medium is to be left in a convex shape, a light power of the first light beam is reduced so as to be equal to or less than the threshold engraving energy, at the upper surface of the convex portion, and at the vicinity region in the vicinity of the outer side of the adjacent region upstream in the scanning direction, a light power of the first light beam is increased to be greater than the light energy, engraving along a line segment connecting the fifth point and the sixth point.

* * * * *